US011773948B2

(12) United States Patent
O'Brien et al.

(10) Patent No.: US 11,773,948 B2
(45) Date of Patent: Oct. 3, 2023

(54) PASSIVE TRANSMISSIONS, AND METHODS OF MAKING AND USING SAME

(71) Applicant: Cornell University, Ithaca, NY (US)

(72) Inventors: Kevin W. O'Brien, Ithaca, NY (US); Robert F. Shepherd, Ithaca, NY (US)

(73) Assignee: Cornell University, Ithaca, NY (US)

( * ) Notice: Subject to any disclaimer, the term of this patent is extended or adjusted under 35 U.S.C. 154(b) by 346 days.

(21) Appl. No.: 16/648,610

(22) PCT Filed: Sep. 19, 2018

(86) PCT No.: PCT/US2018/051758
§ 371 (c)(1),
(2) Date: Mar. 18, 2020

(87) PCT Pub. No.: WO2019/060420
PCT Pub. Date: Mar. 28, 2019

(65) Prior Publication Data
US 2021/0215235 A1    Jul. 15, 2021

Related U.S. Application Data

(60) Provisional application No. 62/560,434, filed on Sep. 19, 2017.

(51) Int. Cl.
*F16H 19/08* (2006.01)
*B25J 9/10* (2006.01)
*F16H 55/54* (2006.01)

(52) U.S. Cl.
CPC .............. *F16H 19/08* (2013.01); *B25J 9/104* (2013.01); *F16H 55/54* (2013.01); *F16H 2019/085* (2013.01)

(58) Field of Classification Search
CPC .......... F16H 55/48; F16H 55/52; F16H 55/54; F16H 19/08; F16H 2019/085; B25J 9/104; B25J 9/1045
See application file for complete search history.

(56) References Cited

U.S. PATENT DOCUMENTS 3,055,229 A * 9/1962 Mecham ............... B65G 39/073
198/494
3,095,821 A * 7/1963 Elenbaas ............... F04D 29/426
415/206

(Continued)

FOREIGN PATENT DOCUMENTS

DE        102007037376 B3    10/2008
WO        2015/184468 A2     12/2015

OTHER PUBLICATIONS

Matsushita, K., et al., Development of Drum CVT for a wire-driven robot hand, 2009 IEEE/RSJ International Conference on Intelligent Robots and Systems, St. Louis, MO, Oct. 11-15, 2009, pp. 2251-2256.

(Continued)

*Primary Examiner* — Charles A Fox
*Assistant Examiner* — Gregory T Prather
(74) *Attorney, Agent, or Firm* — Barnes & Thornburg LLP

(57) ABSTRACT

A transmission is presented, including a spool having a bore. An outer member disposed on the spool, and a cord is configured to at least partially wrap around the outer member. The outer member is configured to constrict and unconstrict to a force applied to the outer member. In this way, rotation of the spool causes a tension force to be applied to the cord, and a greater tension force in the cord will cause the outer member to constrict more than a lower tension force in the cord.

19 Claims, 16 Drawing Sheets

(56) References Cited

U.S. PATENT DOCUMENTS

| | | | | |
|---|---|---|---|---|
| 3,186,885 | A | * | 6/1965 | Iles .......................... F16J 3/041 |
| | | | | 156/194 |
| 4,652,250 | A | * | 3/1987 | Reswick ................... F16H 9/10 |
| | | | | 474/52 |
| 4,741,546 | A | * | 5/1988 | Reswick ................. F16H 55/54 |
| | | | | 280/236 |
| 4,781,663 | A | * | 11/1988 | Reswick ................. F16H 55/54 |
| | | | | 474/49 |
| 5,049,113 | A | | 9/1991 | Graham, Jr. |
| 2003/0190173 | A1 | * | 10/2003 | Suzuki ............... G03G 15/1615 |
| | | | | 399/302 |
| 2008/0054616 | A1 | * | 3/2008 | Rogers ................... B60R 22/46 |
| | | | | 280/805 |
| 2010/0082041 | A1 | * | 4/2010 | Prisco .................... A61B 34/37 |
| | | | | 606/130 |
| 2012/0305870 | A1 | * | 12/2012 | Ruef ....................... F16H 55/48 |
| | | | | 254/390 |
| 2015/0265427 | A1 | | 9/2015 | Herr et al. |
| 2016/0296348 | A1 | | 10/2016 | Herr et al. |
| 2019/0291999 | A1 | * | 9/2019 | Arimachi ............. B29C 39/026 |

OTHER PUBLICATIONS shapingbits.com, Nylon 3D Printing, Sep. 16, 2016, 2 pages. http://www.shapingbits.com/3d-printing-guide/nylon-3d-printing/.
O'Brien, K.W., et al., Elastomeric passive transmission for autonomous force-velocity adaptation applied to 3D-printed prosthetics, Science Robotics, vol. 3, Oct. 17, 2018, ScienceMag.org, 9 pages. http://robotics.sciencemag.org/content/3/23/eaau5543.

* cited by examiner

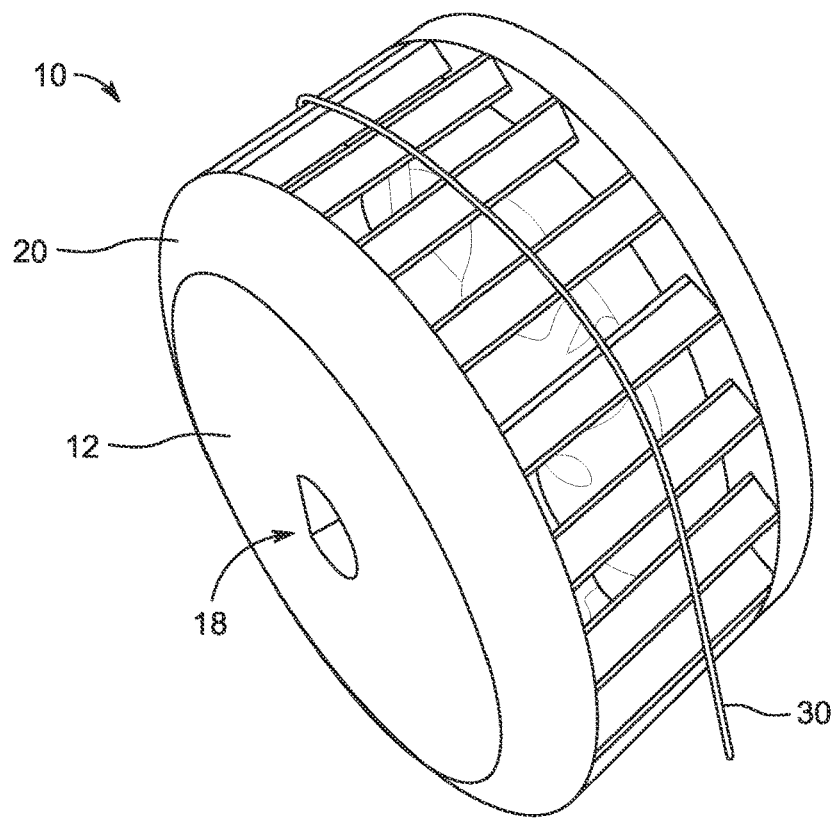
*FIG. 1A*
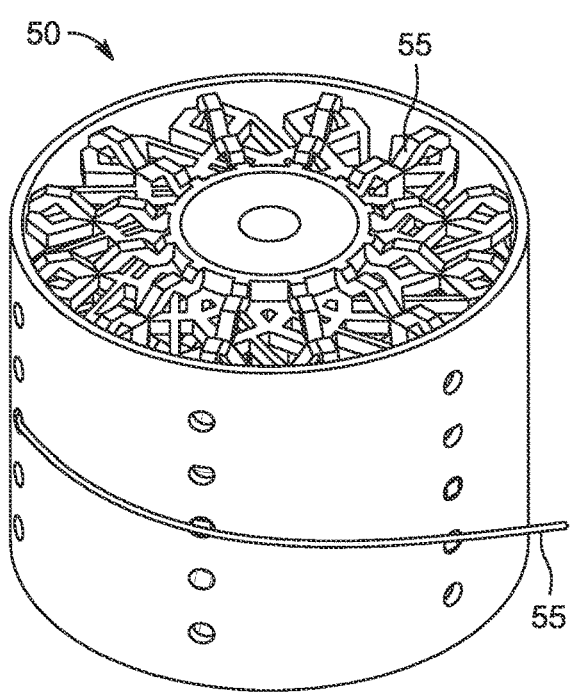 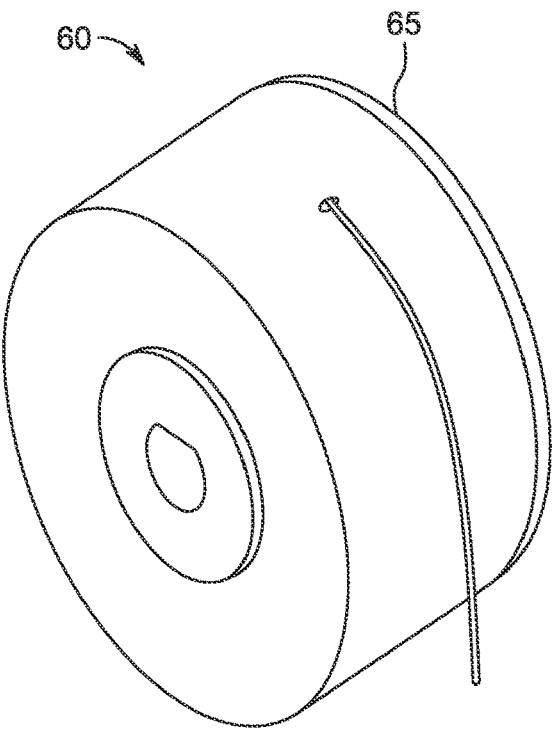
*FIG. 1B*      *FIG. 1C*

PASSIVE TRANSMISSIONS, AND METHODS OF MAKING AND USING SAME

CROSS REFERENCE TO RELATED APPLICATIONS

This application claims priority to U.S. Provisional Application No. 62/560,434, filed on Sep. 19, 2017, the disclosure of which is hereby incorporated by reference.

STATEMENT REGARDING FEDERALLY SPONSORED RESEARCH

This invention was made with government support under contract no. FA9550-15-1-0160 awarded by the Air Force Office of Scientific Research. The government has certain rights in the invention.

FIELD OF THE DISCLOSURE

The present disclosure generally relates to transmissions, and more particularly to passively variable transmissions.

BACKGROUND OF THE DISCLOSURE

The grip strength, grasping speed, and active degrees-of-freedom of even the most advanced prosthetic hands pale in comparison to those of the human hand. Developing prosthetic limbs requires designers to make difficult trade-offs between the size, weight, force, speed, and cost of the actuation system. User studies have shown that 90% of patients with myoelectric prostheses consider their prosthetic hand to be too slow. These studies have also shown that although price is an important factor for these patients, it is not as important as performance. Based on this valuable user feedback, it is easy to see why state-of-the-art prosthetic hands rely on precision motors to achieve the necessary force and speed in a "small-enough" form factor. The excellent performance of these motors, however, comes at a price. At around $200, these precision motors are ten times more expensive than lower-performing motors of similar size (such as micro-metal gear motors). The high cost of motors cause prosthetics to be prohibitively expensive to some users. Lower-cost options are available for these patients. 3D-printed prosthetic hands may be produced for around $1,500 using such lower-cost options. The combination of speed and strength of these powered hands is limited due to the use of less costly motors, as well as the materials from which they are composed (i.e., acrylic, TPU, and PLA).

A good solution to this classic engineering contradiction of speed vs. force is to dynamically adjust the motor's effective gearing ratio. Many of the systems used to accomplish this dynamic adjustment, such as the Passively Variable Transmission, load-sensitive Continuously Variable Transmission (CVT), and the Adjustable Power Transmitting Mechanism use jointed mechanisms. Another known system uses a variable pitch roller to adjust the angle at which a string spools around a cylindrical rod. Another known system uses dual-mode twisting of strings to provide high speed in one configuration and high force in the other. Additionally, a drum CVT that changes the radius at which a string spools around a cylinder by compressing a spring in the center of the transmission was previously developed. Though each of these systems have their merits, they are limited by their size, complexity, and material requirements. These same requirements preclude 3D printing them for compact and custom prosthetics.

Accordingly, there is a need for a solution that would marry the speed and strength of high performance motors with the cost, simplicity, and versatility of low-cost, 3D-printed transmissions.

BRIEF SUMMARY OF THE DISCLOSURE

In an aspect of the present disclosure, a transmission is presented. The transmission is configured to dynamically modify the force of an actuator based on the tension in a cord which is driving the force. The force exerted by the actuator is modified by increasing or decreasing the radius of the transmission at the point of contact with the cord. The radius of the transmission increases or decreases by constricting or unconstricting the transmission by the tension of the cord. The tension of the cord may also compress and decompress the transmission. The tension of the cord may also constrain and unconstrain the transmission. When the cord is under low tension, the transmission is under low constriction, and the actuator exerts relatively low force on the cord. As the tension in the cord increases, the transmission compensates by constricting and reducing its radius at the point of contact with the cord, allowing the actuator to exert greater force on the cord. The transmission may be a composite of two or more materials. The transmission may be made out of a single material.

In another aspect of the present disclosure, a transmission is presented, including a spool having a bore, and a constrictable outer member disposed on the spool, where the outer member is configured to constrict and unconstrict proportionally to a force applied to the outer member. In this configuration, the outer member constricts and unconstricts due to the tension of the cord, while the volume of the spool remains fixed. As an example, the outer member may include an array of vanes arranged radially about the bore. In another example, the outer member may include a first side wall, a second side wall, and a plurality of struts connecting the first side wall and the second side wall. The plurality of struts may be arranged in a circular pattern about the bore.

Described is a 3D-printed passively variable transmission for use in tendon driven actuation systems. These simple, low-cost transmissions known as Elastomeric Passive Transmissions (EPTs) were integrated into a 3D-printed prosthetic hand which demonstrates high speed and high force in a lightweight package.

Described herein are low-cost, 3D-printed CVT system based on elastomeric material that are referred to as Elastomeric Passive Transmission (EPT). These EPTs are, essentially, rubber wheels mounted on a rotatory motor that spool a cord—they continuously decrease their moment of inertia as load is applied. At no load, they have a large radius and spool quickly for fast actuation, but apply less total force as they require more torque from the motor to cause rotation. At high load, their radius has minimized and more motor torque can be used for applying force; however, they spool more slowly and result in decreased actuation velocities. In addition, the EPTs of the present disclosure also serve as a series elastic element which assist in shock tolerance, improved force control, and reduced reflected inertia.

DESCRIPTION OF THE DRAWINGS

For a fuller understanding of the nature and objects of the disclosure, reference should be made to the following detailed description taken in conjunction with the accompanying figures.

FIG. 1A shows a transmission according to an embodiment of the present disclosure;

FIG. 1B shows a transmission having a lattice outer member according to another embodiment of the present disclosure;

FIG. 1C shows a transmission having a foam outer member according to another embodiment of the present disclosure;

DETAILED DESCRIPTION OF THE DISCLOSURE

Figure 1D:
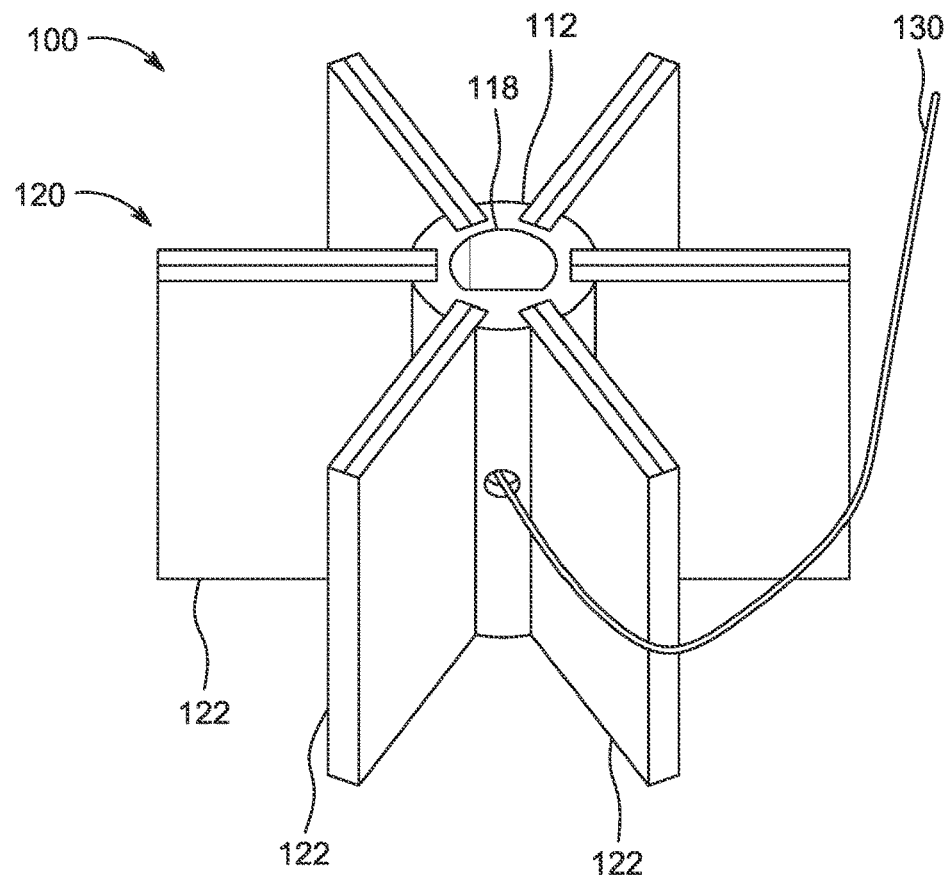
FIG. 1D shows a transmission wherein the outer member comprises a plurality of vanes according to another embodiment of the present disclosure.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

In an aspect of the present disclosure, a variable transmission is provided. The transmission may be considered a "passive transmission" is able to respond to a changing load without the need for active components to, for example, move gears into and/or out of place. In a first embodiment, depicted in FIG. 1A, the transmission 10 includes a spool 12 having a bore 18. The spool 12 may be generally cylindrical in shape with a radius of R. The bore 18 may be disposed along a longitudinal axis of the cylinder shape. The bore 18 may be configured to engage with a shaft. The shaft may be connected to, or make up a part of a driver, such as, for example, a motor or a hand crank. For example, the bore 18 may be asymmetrical, have a keyway for keyed engagement with the shaft, or be configured for an interference fit with the shaft. Other configurations for engaging a shaft will be apparent to one skilled in the art in light of the present disclosure. The bore 18 may be centrally located with respect to the spool 12—i.e., along a central longitudinal axis of the cylindrical shape (coaxial with the spool). In some embodiments, the bore 18 may be offset from the center axis of the spool 12.

The transmission 10 includes a constrictable outer member 20 disposed around a circumference of the spool 12. The outer member 20 may be coaxial with the bore 18. The outer member 20 has an initial radius of $R_o$, and is constrictable such that this initial radius can be reduced (as further described below).

The transmission 10 includes a cord 30 configured to at least partially wrap around the outer member 20. The cord 30 may be attached to the spool 12 at a first end 32 and is configured to be attached at a working end to an object to be moved by the cord 30. In a non-limiting example where a transmission is used to move a digit (e.g., a finger) in a prosthetic hand, the cord 30 may work as a tendon attached to the digit to be moved. When the transmission 10 is rotated about the bore 18, the cord 30 wraps or unwraps from the outer member 20 thereby moving an attached object closer to or further away from the transmission 10. In this way, the torque of a motor (when such a driver is connected to the bore 18) will be transmitted as a tension force in the cord 30 and the tension force will be related to the torque according to the distance between the motor axis and the point at which the force is transferred to the cord (i.e., the radius at the location around which the cord 30 is wrapped).

The relationship between the torque and the tension force is therefore changed as the radius of the outer member 20 changes. The outer member 20 is configured to be constrictable such that the radius of the outer member 30 increases or decreases due to the tension of the cord. In other words, as the tension within the cord 30 is increased, the cord wraps tighter around the outer member 20 and the radius of the outer member (where the cord is wrapped) will be decreased by this tighter wrapping (see, e.g., FIGS. 17 and 18). In this way, the transmission 10 is able to dynamically modify the rotational force transmitted to the cord 30 based on a tension in the cord 30.

In the embodiment of a transmission 50 shown in FIG. 1B, the outer member 55 is a lattice. The lattice may have varying configurations such as, for example, a foam (see transmission 60 with foam outer member 65 of FIG. 1C). The lattice may be configured to collapse as force is applied such that tension on a cord 53 will cause the outer member 55 to have a reduced radius. This radius will be further reduced as the tension of the cord increases and the lattice collapses further. Likewise, the lattice is configured to be resilient such that the radius will increase as a tension force in the cord is reduced.

In some embodiments, a rigidity of the spool 12 is greater than a rigidity of the outer member 30. In this way, the spool can be sufficiently rigid so as to allow transmission of rotational motion from a shaft without slippage, while the outer member is constrictable. Such rigidity may be a result of the structure of the component (spool or outer member) and the material(s) from which the component is made. The spool may be made from materials such as, for example, a metal or alloy (e.g., steel, aluminum, titanium); a polymer or polymer composite (e.g., nylon, polycarbonate, polyester, polyethylene, polypropylene, polystyrene, polyvinyl chloride, acrylonitrile butadiene styrene, polyurethane, epoxy, acrylic, phenolics, melamine formaldehyde, urea-formaldehyde, PEEK, maleimide, PEI, polyimide, plastarch, polylactic acide, polysulfone, or carbon fiber), an organic material (e.g., wood, bioplastic), or any combination of two or more materials. These are only non-limiting, exemplary materials and the list is not intended to be exhaustive. In some embodiments, the spool material is suitable for injection molding or 3D printing.

The outer member may be made from an elastic material such that it can undergo repeated shape changes while returning to its original shape when not under load. In some embodiments, a suitable material is an elastomer such as, for example, silicone, polyurethane, nitirile, polyisoprene, polybutadiene, chloroprene, butyl rubber, styrene-butadiene, EPM, epichlorohydrin, polyacrylic rubber, fluoroelastomers, PEBA, CSM, EVA, and TPE. The constrictable material could also be a non-stretchable elastic material such as spring steel or nylon. In some embodiments, the outer member may be made from the same material as the spool. In such cases, a difference in rigidity between the spool and the outer member may be due to the physical structure of the components. In some embodiments, where the spool and outer member are made from the same material, the spool and outer member may be formed as one continuous piece.

In some embodiments, a spool of a transmission may be made of any material with a higher elastic modulus than the outer member, including wood, steel, aluminum, nylon, or carbon fiber. The spool may comprise polyurethane, such as RPU 70. The outer member may comprise polyurethane, such as EPU 40. The outer member may comprise a foam, 3D-printed lattice, silicone, or elastomeric material(s) such as nitrile, latex, or butyl rubber.

Figure 1E:
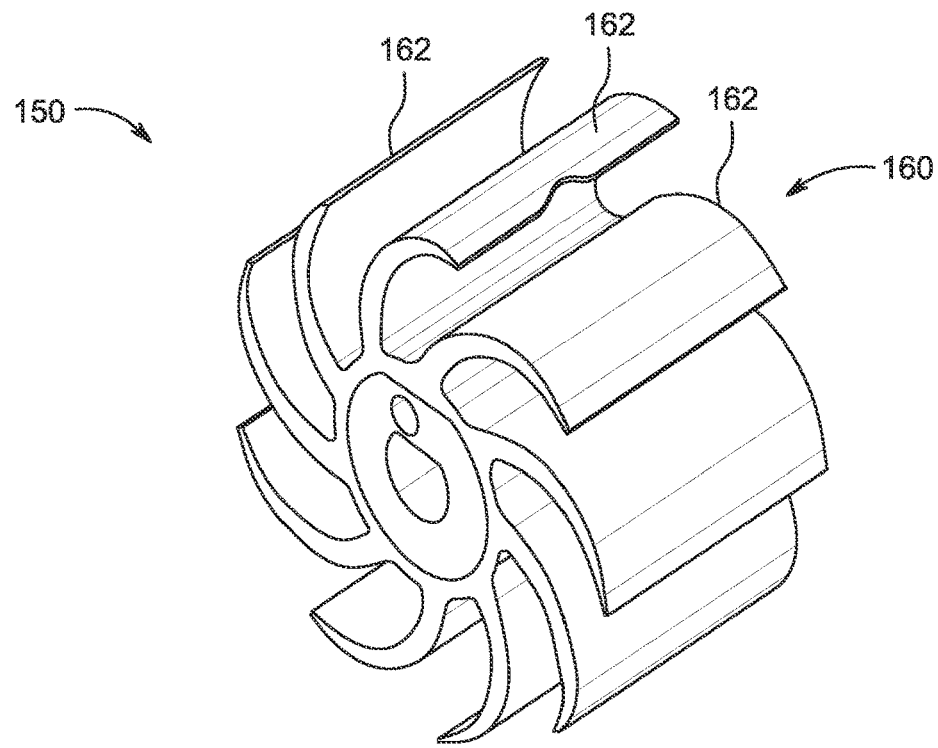
FIG. 1E shows a transmission wherein the outer member comprises a plurality of curved vanes according to another embodiment of the present disclosure.

In another embodiment, a transmission 100 has a spool 112 with a bore 118, and the outer member 120 comprises a plurality of vanes 122 (see, e.g., FIG. 1D). Each vane 122 is arranged radially about the bore 118. The cord 130 is configured to wrap around an outer circumference generally described by the outward end 123 of each vane 122. The vanes are configured such that a tension force in the cord 130 will cause each vane 122 in contact with the cord 130 to bend, thereby reducing the outer radius of the outer member 120. As the tension force increases, each vane 122 will bend further to create a smaller outer radius until a tension force causes a minimum radius to be reached. The vanes 122 are constructed of an elastic material or materials such that when the tension force in the cord 130 is reduced, the outer member 120 will increase in outer radius. The vanes 122 will return to their "relaxed" state (maximum outer radius of the outer member 120) once the tension force is eliminated. The vanes 122 may be straight in the (i.e., no tension force in the cord). In other embodiments, such as the transmission 150 shown in FIG. 1E, the outer member 160 is formed by a plurality of vanes 162 that are curved when in the relaxed state.

Figure 2A:
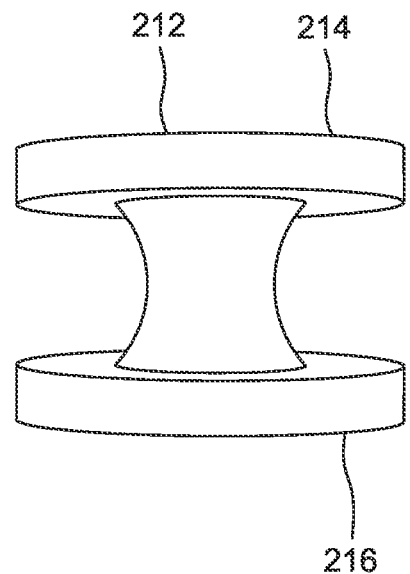
FIG. 2A shows a spool having side walls.
Figure 2B:
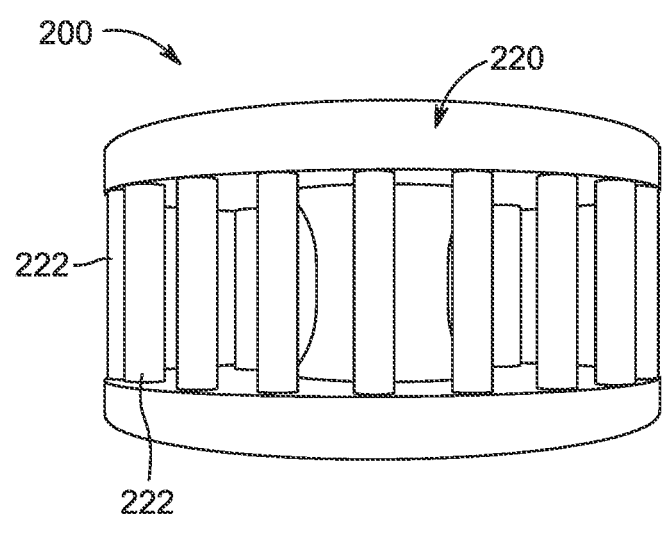
FIG. 2B shows a side view of a transmission having an outer member comprising a plurality of struts.

In another embodiment of a transmission 200, the spool 212 has a first side wall 214 and a second side wall 216. The first side wall 214 and second side wall 216 are coaxial with the bore (see, e.g., FIGS. 2A and 2B). The outer member 220 connects the first side wall 214 with the second side wall 216. For example, in the embodiment depicted in FIG. 2B, the outer member 220 includes a plurality of elastomeric struts 222 which each connect the first side wall 214 to the second side wall 216. By connection the side walls, the outer member may be disposed between the side walls, connect the side walls along the outer periphery of the side walls, and/or form other connections from one side wall to the other. In some embodiments, such as that depicted in FIG. 2B, the transmission 200 has a space bounded by the first and second side walls 214,216 and the outer member 220. In this way, the outer member 220 will constrict when the elastomeric struts 222 deform into the space between the side walls. The elastomeric struts 222 may be disposed in a circular pattern around the bore 218.

FIG. 19 is a graph showing the spooling radius ratio of three different transmission geometries as a function of tension in the cord. Each geometry in FIG. 2 includes either 12 or 20 struts. In FIG. 19, the spooling radius is defined by R. The spooling radius is the radial distance from the center of the component to the tendon during operation. The naming convention for each plot is (N)×(2r)×(h) where N is the number of struts, 2r is the strut diameter, and h is the strut height.

In other embodiments, the outer member may be disposed in the cavity between the first and second side walls and no space is present. For example, the outer member may be a lattice, such as a foam material, disposed between the first and second side walls of the spool. In other embodiments, the space may be occupied by components other than the outer member.

Figure 3:
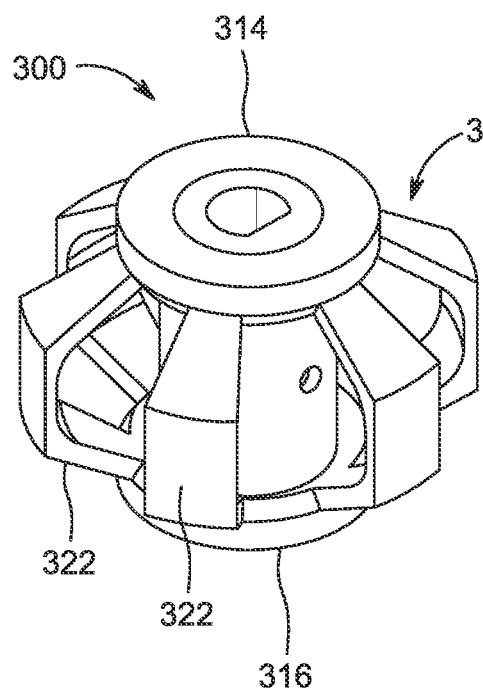
FIG. 3 shows another embodiment of a transmission having an outer member with a plurality of struts.
Figure 4:
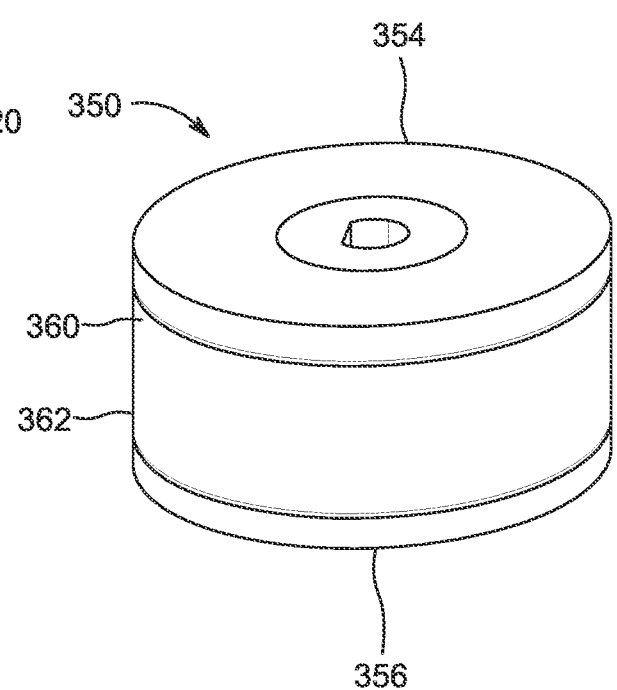
FIG. 4 shows another embodiment of a film outer member.

FIG. 3 depicts another embodiment of a transmission 300 wherein the outer member 320 comprises a plurality of struts 322 between the first side wall 314 and second side wall 316. FIG. 4 depicts another embodiment of a transmission 350 wherein the outer member 360 is a film 362, such as an elastomeric film, disposed between the first side wall 354 and the second side wall 356. In some embodiments, the film is a fabric. The fabric may be a woven or non-woven fabric. The fabric may be comprised of one or more types of elastic fibers such as, for example, Lycra. The elastomeric film may further include one or more holes through the film. In embodiments with more than one hole in the film, the holes may be patterned or randomly distributed. The holes may be of any size and the holes may or may not be of equivalent size.

The transmission can be used in any system where a cord is used to convert rotary motion to linear motion. For example, the system could be one in which the rotary motion is driven by a motor such as is in robotic systems. In this use case, the transmission could be used at each joint of a robot, such as the arms, legs, end effectors, or intermediate joints. The transmission could also be used when the rotary motion is generated manually such as, for example, a crank operated pail retrieval system or parasol.

Figure 16:
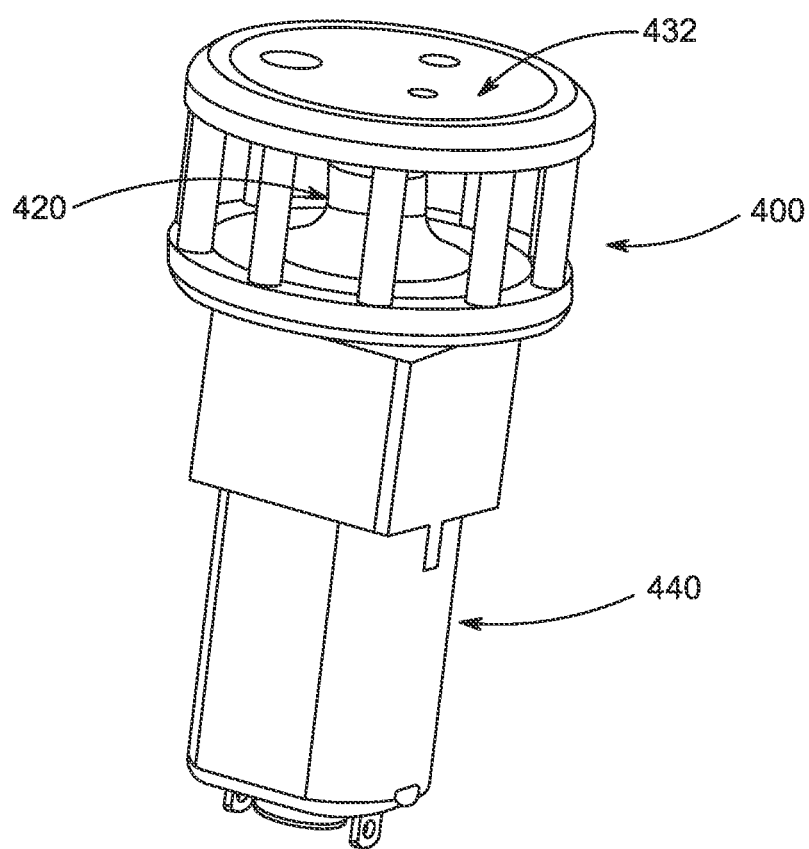
FIG. 16 depicts a transmission mounted to a motor.

FIG. 16 depicts a transmission 400 wherein the spool 420 is attached to a motor 440. A cord coupler 432 is also shown. In this example, the cord coupler 432 is a hole through which a cord (not shown) may be disposed and anchored. In other embodiments, the cord coupler may be an attachment point to which a corresponding coupler (affixed to an end of the cord) may be attached. Other techniques for attaching the cord to the transmission will be apparent in view of the present disclosure. The cord may couple with the spool, the outer member, or any other component present in a given transmission such that the cord is able to act on the outer member to provide the advantages described herein. The cord may be of any design suitable for the particular application. For example, the cord may be a rope, a cable, a wire, a single filament, a multifilament cord, etc. The transmission may have more than one cord, where each cord is attached to the same component to be moved or different components. In some embodiments, as in the prosthetic described below, the cord may act as a tendon.

Figure 6A:
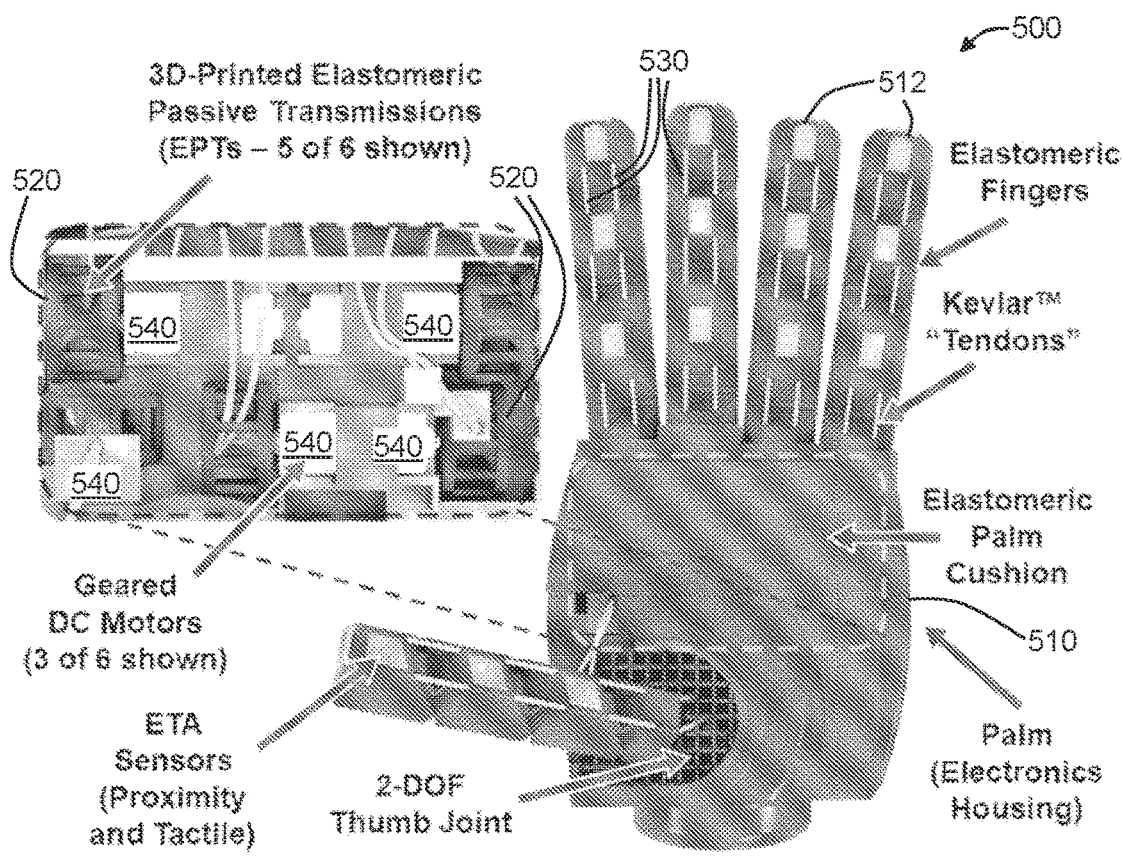
FIG. 6A is an image depicting a rendering of the ADEPT hand with its main components listed.
Figure 7:
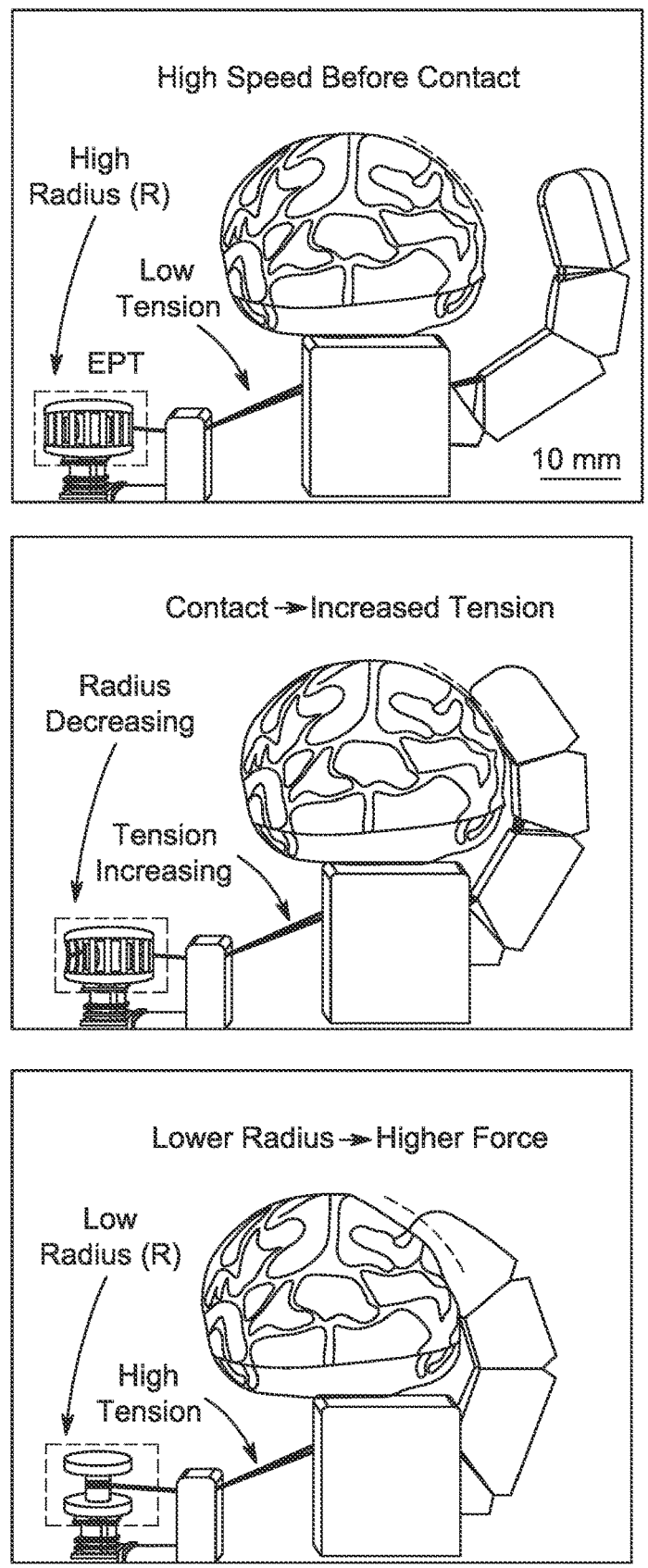
FIG. 7 is a series of three images showing increasing tendon tension causes a reduction in spooling radius of the EPT leading to higher output forces.

In another aspect, the present disclosure may be embodied as a prosthetic 500. The prosthetic 500 includes a prosthetic body 510 having a movable member 512 (see, e.g., FIG. 6A). For example, the movable member 512 may be a prosthetic finger. The prosthetic 500 includes a transmission 520 according to any embodiments of the present disclosure. For example, depicted in FIG. 6A, the prosthetic 500 includes five transmissions 520 having outer members made up of a plurality of struts (see inset). The cord 530 of each transmission 520 is attached to a corresponding movable member. In the example of FIG. 6A, two cords 530 are provided for each transmission 520 (more accurately, the two cords are a single piece that loops through the corresponding finger 512 of the prosthetic 500). In this example, the cords 530 serve as tendons. The prosthetic 500 further includes a motor 540 (or in the case of the example, five motors). A drive shaft of each motor 540 is disposed within the bore of the corresponding transmission 520. As such, rotation of the motor 540 will cause movement of the movable member 512 (see also FIG. 7). The force applied by the tendon varies relative to the tension in the tendon, as the tension will cause the outer member of the transmission to constrict and unconstrict. As the prosthetic finger requires greater force to move, the radius of the transmission 520 at the point of contact with the cord 530 decreases due to constriction of the outer member, which in turn causes the cord to exert greater force on the prosthetic finger 512. The tendon may be made of any suitable material such as, for example, Kevlar, nylon, Teflon coated fiberglass, or steel. Suitable cords may be made of materials having sufficient tensile strength for a particular application.

The transmission assembly may include structures for attaching and removing the cord. One example of such a mechanism is a hole for insertion of a cord with a T-bar affixed to its end allowing for the cord to be easily inserted while still preventing the cord from being pulled back through the hole. The transmission assembly may include components for measuring the level of deflection of the constrictable component, which correlates to the measurement of the spooling radius. Examples for measuring the level of deflection include sensors for measuring resistive or capacitive changes due to material deformation, or measuring deflection directly using optical or other electromagnetic methods.

The transmission may include components for measuring the level of deflection of the constrictable outer member, which correlates to the measurement of the spooling radius. Examples of this could include measurements of resistive or capacitive changes due to material deformation, or measuring deflection directly using optical or other electromagnetic methods.

EXAMPLE

This example provides a non-limiting description of the function, composition, and methods of manufacture of an exemplary transmission sometimes referred to herein as an Elastic or Elastomeric Passive Transmission ("EPT"). This disclosure describes the ADEPT Hand as a vehicle to demonstrate the speed and strength afforded by the newly developed EPTs.

EPTs are designed to dynamically modify the maximum output speed and force of an actuator based on the tension in the tendon which is driving it. This passive adjustment is achieved through the material selection and geometry of the EPT. The rigidity of the spool allows the EPT to securely mount to the motor shaft, while the EPU struts give the system its dynamic spooling radius.

Proper functioning of an EPT is dependent on its geometry and material properties, and must be tuned based on the stall torque of the motor driving it. If the stiffness of the elastomeric struts is too low, the EPT will move into 'high force mode' even if the finger is unblocked; it will act like a rigid spool with low radius. On the other hand, if the stiffness is too high, the struts will not be pulled to the center of the spool before the motor stalls; it will act like a rigid spool of high radius. The optimal spool design ensures that the tendon spools with maximum radius when the finger bends unimpeded and at the minimum radius just before the motor stalls. A mathematical model (Equation 1) is disclosed to assist with tuning the EPTs for optimal performance based on motor stall torque.

$$\tau_{stall} = \frac{(R_i + 2r)E\pi r^2 \sqrt{(R - R_i - 2r)^2 + \left(\frac{h}{2}\right)^2} - h}{h * \cos\left(90 - \frac{180}{N}\right)} \quad (1)$$

Figure 5A:
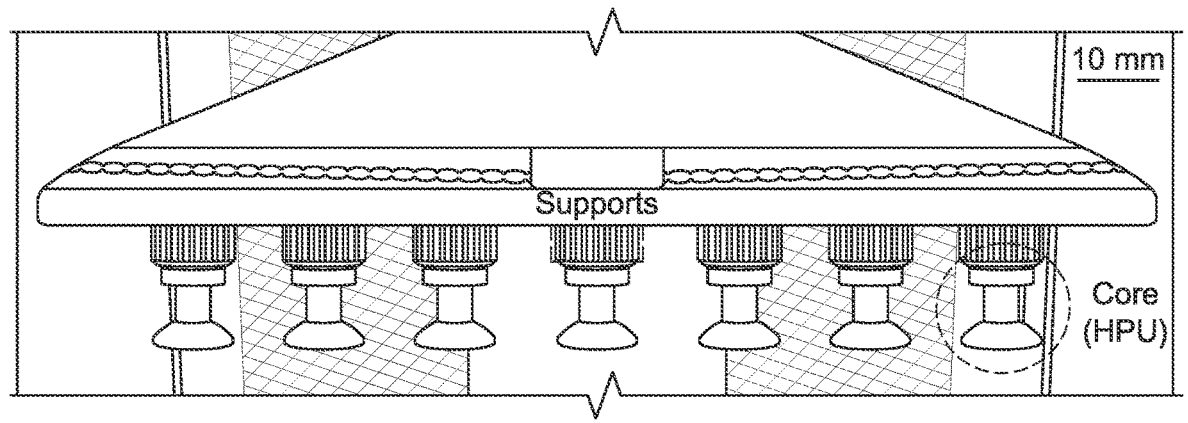
FIG. 5A is an image of EPT manufacturing via projection stereolithography of a spool.
Figure 5B:
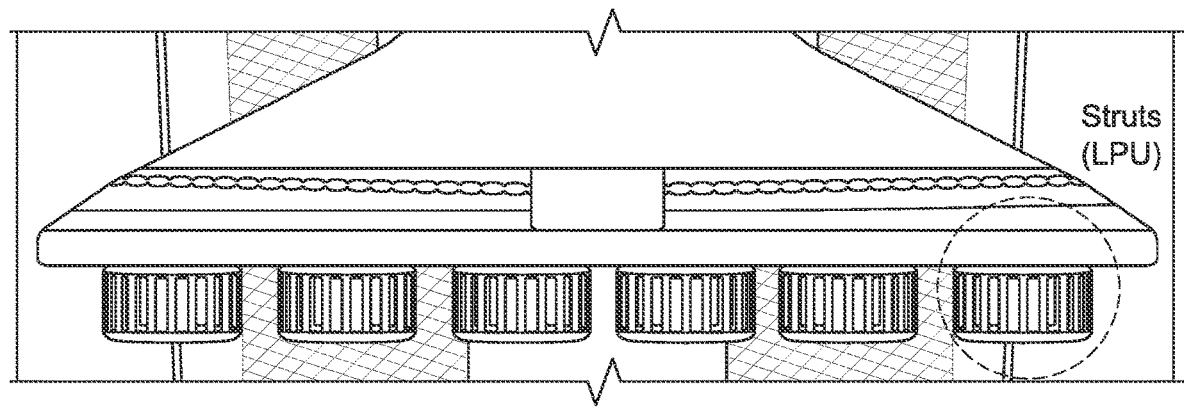
FIG. 5B is an image of EPT manufacturing via projection stereolithography of a ring of elastomeric struts.
Figure 5C:
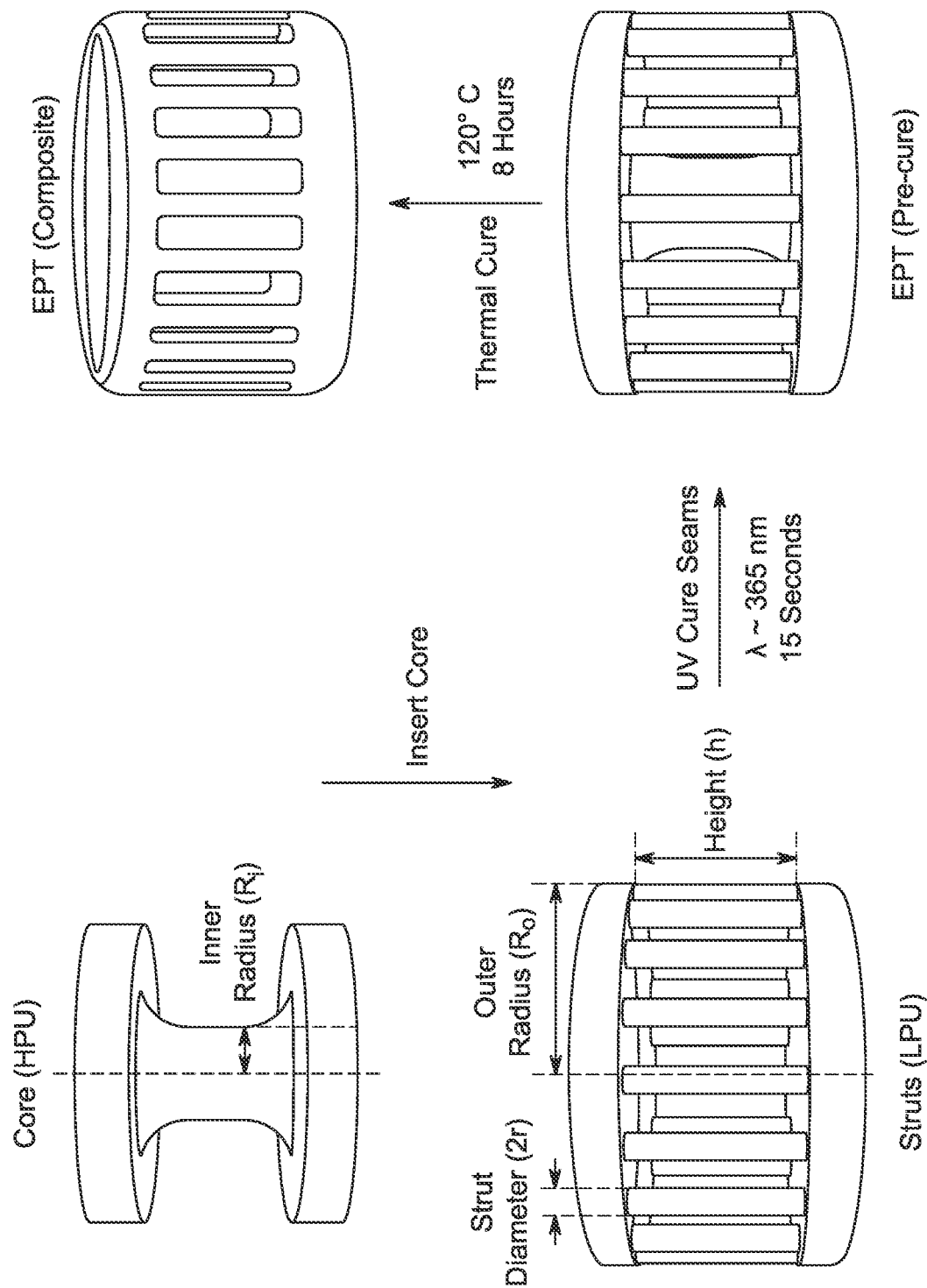
FIG. 5C is a series of four images depicting two parts are cured together to form a polyurethane composite.

In Equation 1, $\tau_{stall}$ is the motor torque required to strain the EPU struts all the way to the rigid core. This value is based on the motor and associated gearbox. $R_i$ is the radius of the rigid core, r is the radius of each of the struts, E is the elastic modulus of EPU, h is the height of the struts, N is the number of struts, and $R_o$ is the outer radius of the EPT. These dimensions are depicted in FIG. 5C. In this simplified model we assume that each EPT strut is only in tension—we do not model any shear or compressive strains. Figure shows that the mathematical model can help in choosing EPT geometries well suited for various motors with differing stall torques.

DISCUSSION

The simplicity of the EPT design allows it to be small, lightweight, and inexpensive to manufacture. It also allows for easy adjustment of the design to work with a variety of different motors. Potential improvements to the current EPT design are possible regarding the materials used for manufacturing, the viscoelasticity of the materials, and the circumference problem. The circumference problem is a reference to the fact that the strut geometry (number of struts—N, and strut radius—r) may be designed such that the struts come in contact with each other before contacting the inner core. This problem can be solved by adjusting the strut geometry and/or using an outer (constricting) layer of higher elastic modulus. Though the weight of the hand as disclosed is within acceptable limits, the form factor is larger than desired. This is largely due to the use of off-the-shelf breakout boards for the microcontroller, current sensors, and motor drivers. A custom designed printed circuit board for all of these associated electronics would improve the form factor of the ADEPT Hand.

Materials and Methods

The objective of this disclosure is to demonstrate the utility of Elastomeric Passive Transmissions in tendon-driven actuation systems to improve their maximum speed and/or force. EPTs were integrated into a prosthetic hand because these systems present extreme design challenges: users need a hand with high grip strength, high closing speed, light weight, and small form factor—all at the lowest possible price. Though there are many possible variations of the EPT (geometry, materials, manufacturing methods, etc.) this disclosure describes designing them using stereolithography of elastomeric materials due to the precision and repeatability of the process, the ease of manufacturing, and the speed of iteration.

The force, speed, dexterity, and compact size required of prosthetic hands presents an extreme design challenge for engineers. Current prosthetics rely on high-cost motors to achieve adequate force and speed in a small enough form factor. Described herein is a simple, compact, and cost-effective continuously variable transmission produced via projection stereolithography. The transmission, referred as an Elastomeric Passive Transmission (EPT), is a polyurethane composite cylinder which autonomously adjusts its radius based on the tension in a cord spooled around it. Six of these EPTs were integrated into a 3D-printed soft prosthetic hand with six active degrees of freedom. The EPTs provided the prosthetic hand with ~3× increase in grip force without compromising flexion speed. This increased performance led to finger closing speeds of ~0.5 seconds (Γ~180 degrees s$^{-1}$) and maximum fingertip forces of ~32 N per finger.

Many prosthetic hands and robotic grippers have been designed using tendon-driven actuators. To demonstrate the capabilities of the described EPTs, they were used to fabricate a six degree of freedom (DOF) tendon driven prosthetic hand that displays an excellent combination of gripping speed and strength, at a low cost. A projection stereolithography 3D printer was used to fabricate customized EPTs and fingers rapidly and with high resolution. The motor integrated hand, called ADEPT (Adaptively Driven via Elastomeric Passive Transmissions), has a mass of ~399 grams and a material cost of less than $500.

Results Using Test Embodiment

Elastomeric Passive Transmission Design

The elastomeric passive transmission is an intelligent composite which autonomously adjusts its spooling radius for mechanical advantage based on environmental interaction. The degree of passive adjustment was tuned through the material selection and geometry of the EPT. Each EPT was a composite comprising both high (H-) and low (L-) modulus polyurethanes (PU). The spool of the EPT was made from HPU (RPU 70, Carbon, Inc), ensuring that a bore of the spool does not slip on a motor shaft. This spool was surrounded by a ring of LPU (EPU 40, Carbon, Inc) struts which gave the system its dynamic spooling radius. The EPT test embodiments were printed in two parts and bonded together during the final curing stage (FIGS. 5A, 5B, and 5C). Continuous Liquid Interface Production (CLIP) projection stereolithography was used to print both components of the EPT. CLIP is characterized by the persistent liquid interface which is maintained by an oxygen permeable membrane between the projection window and a bath of liquid resin. The speed afforded by this photopolymerization "dead zone" along with the inherent parallel nature of stereolithography allowed the ability to rapidly print and iterate the design of the test embodiments.

Though EPTs could prove useful in any tendon-driven actuation system, their utility was demonstrated in a 3D-printed soft prosthetic hand. In this prosthetic hand application, each EPT is caused to spin by way of a motor, and a Kevlar® tendon winds around its circumference. The tendon pulls the tip of an elastomeric finger to cause the finger bending. If the finger is unobstructed, the tension in the tendon remains low and the spooling radius remains close to its resting radius—this results in high-speed actuation (see FIG. 7). If the finger is blocked (while grasping an object, etc.), the tendon's tension increases as the motor turns. The increasing tension strains the EPT's elastomeric struts, pulling them toward the spool and decreasing the spooling radius of the tendon. The decreased spooling radius allows the motor to deliver a higher maximum force for a given motor stall torque (FIG. 8B). The change in radius due to tension, $R_T$, can be modeled by equation 2:

$$R_T = \sqrt{\left(\frac{Th\cos\left(90° - \frac{180°}{N}\right)}{2E\pi r^2} + \frac{h}{2}\right)^2 - \left(\frac{h}{2}\right)^2}$$

After the LPU struts contact the HPU inner core, they are squeezed; this results in a further reduction of radius due to compression of the elastomeric struts, $R_c$ and is modeled by equation 3:

$$R_c = R_i + 2re^{\frac{T_c - T}{R_i E_c w}}$$

In these equations, h is the height of the elastomeric struts, N is the number of struts, w is the width of tendon contact with the EPT, and $T_c$ is the tension at which the struts initially contact the core of the EPT. E is the storage modulus of LPU in tension—due to a non-linearity in this modulus at low strains, E is approximated as 3.9 MPa at strains <40% and 2.5 MPa otherwise. $E_c$ ~4.5 MPa is the compressive modulus of LPU at $\varepsilon_c$=50% strain. The dimensions of an EPT are depicted in FIG. 5C for further clarification and the equations are derived in the supplemental material. In the model, the spooling radius, R, was defined as $R=R_o-R_T$ before the struts come in contact with the spool (for $R>R_i+2r$) and $R=R_c$ after the struts contact the spool (for $R<R_i+2r$).

Figure 8A:
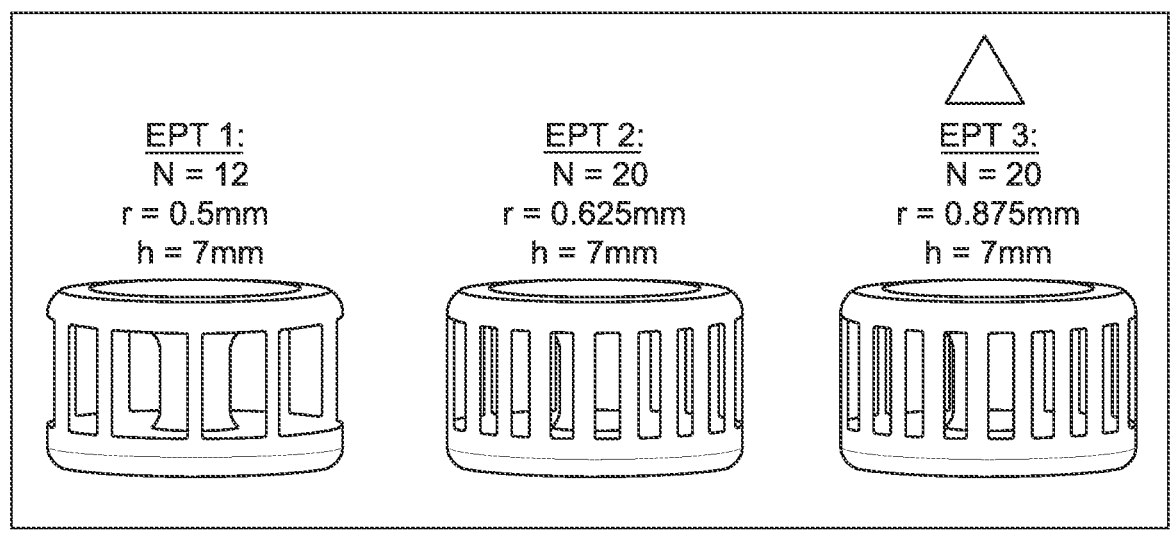
FIG. 8A is an image of three EPTs with different geometries and spring equations.
Figure 8B:
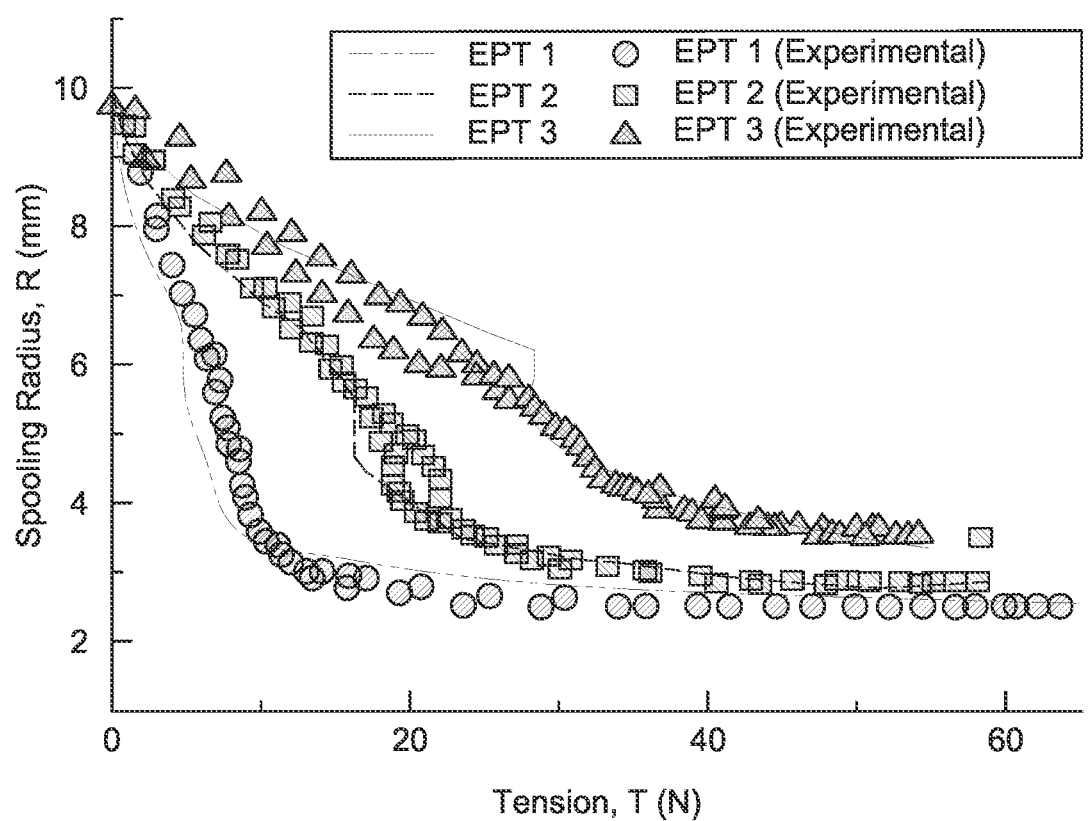
FIG. 8B is a graph depicting the spooling radius of the three EPTs as a function of tendon tension (solid symbols) compared with their theoretical values (dashed lines)

To better understand the validity of the presented mathematical model, EPTs were built with three different geometries and named them according to FIG. 8A. For example, the EPT with N=20 struts, r=0.0625 mm, and h=7 mm, is referred to as EPT 2. All of the EPTs tested had an outer radius, $R_o$=10 mm and an inner radius, $R_i$=2.5 mm. The tendon tension and the associated EPT spooling radius of each of these three EPT geometries when driven by four different motors of varying gear ratio was measured. A comparison between the experimental data and theoretical model of spooling radius vs. tendon tension can be seen in FIG. 8B.

Proper functioning of an EPT is dependent on its geometry and material properties and must be tuned based on the stall torque of the motor, T, and the mechanical resistance of the actuator, $F_A$. To tune this system, two geometric and material property dependent parameters were defined for the EPTs: (i) $SRR_{max}$, the maximum spooling radius ratio (SRR), and (ii) $SRR_{\mathit{eff}}$, the effective SRR in operation with a motor and actuator. The SRR can be viewed as the amount by which an EPT will multiply the stall force of a tendon-driven actuator as compared to a rigid spool of the same outer radius. $SRR_{max}$ is dependent only by the geometry of the EPT and is defined simply by: $SRR_{max}=R_o/(R_i+r)$ where $R_o$ is the EPT's outer radius, $R_i$ is the radius of the EPTs spool (FIG. 5C). $SRR_{\mathit{eff}}$, on the other hand, is dependent on geometry and material properties of the EPT as well as r and $F_A$. When determined empirically, the effective spooling radius ratio is defined by $SRR_{\mathit{eff}}=R_{oe}/R_{ie}$ where the effective outer radius, $R_{oe}$, is the spooling radius when an unloaded actuator is fully actuated and the effective inner radius, $R_{ie}$, is the spooling radius when the motor stalls.

In addition to direct measurement, $SRR_{\mathit{eff}}$ can be modeled based on a radius dependent spring equation, K(R), motor stall torque, and actuator mechanical resistance. The spring equation can be approximated using Hooke's Law (K(R) =T/ΔR) where ΔR is the change in spooling radius caused by the tendon tension. To simplify the calculation of K(R), $R_c$ and β were removed to approximate ΔR with $\Delta R=R_T$. Using eqn. 2 to substitute for $R_T$, the spring equation of an EPT is defined as:

$$K(R) = \frac{2E\pi r^2 \left( \sqrt{(R_o - R)^2 + \left(\frac{h}{2}\right)^2} - \frac{h}{2} \right)}{h(R_o - R)\cos\left(90° - \frac{180°}{N}\right)}$$

In calculating $SRR_{\mathit{Eff}}$, $R_{oe}$ can be approximated with:

$$R_{oe} = R_o - \frac{F_A}{K_o}$$

where $K_o$ is K(R) evaluated at some factor of $R_o$. In this equation, $R=0.8R_0$ was used due to reduction in the spooling radius from $F_A$. Similarly, $R_{ie}$ can be approximated with:

$$R_{ie} = R_o - \frac{\tau}{(R_i + r)K_i}$$

where $K_i$ is K(R) evaluated R=$R_i$+r. Including the strut radius (r) in the calculation of $K_i$ allows for a simple method to partially account for compression in the elastomeric struts.

Figure 8C:
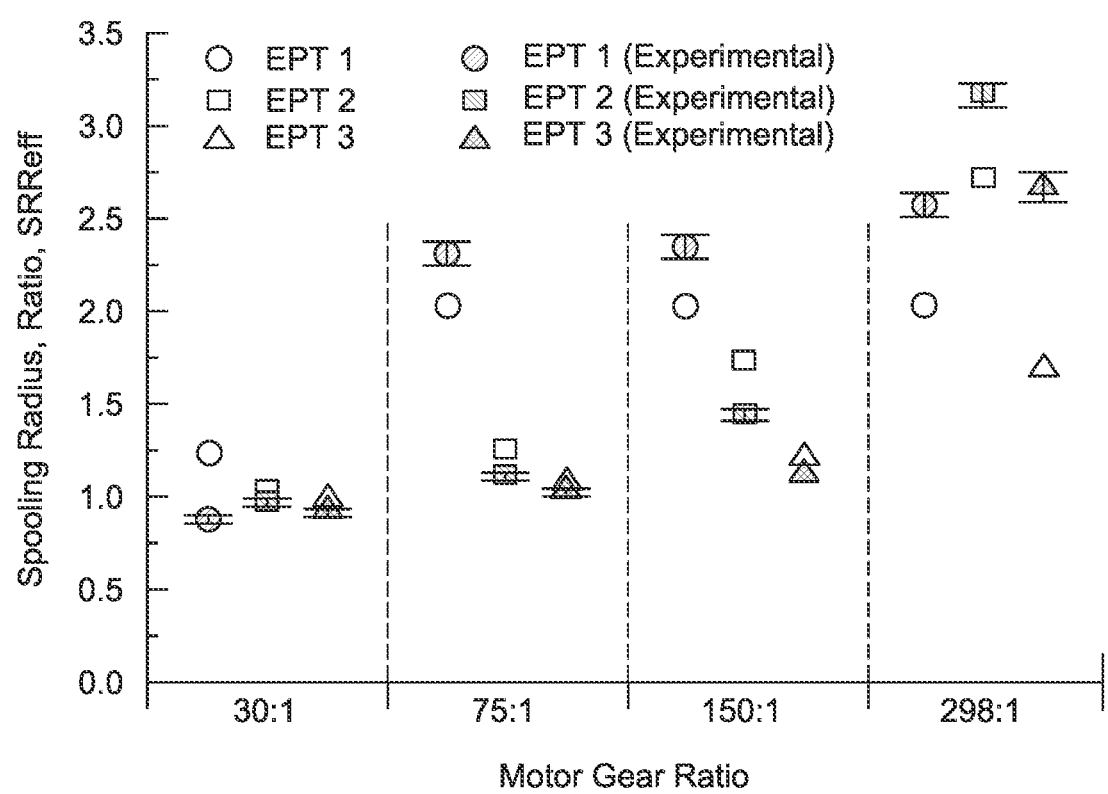
FIG. 8C is a graph depicting the Spooling Radius Ratio (SRR) of each EPT when driving a finger actuator ($F_A$~2.5 N)—theoretical values are represented as open symbols, experimental values as solid symbols.

This framework was used to predict $SRR_{\mathit{Eff}}$ for three different EPT geometries (FIG. 8C) when driven by motors of various gearing ratios (and thus different stall torques) while driving a finger actuator ($F_A$~2.5 N). As expected, this model predicts which EPT geometry is best suited for each actuation system. For the 298:1 gear ratio motor (τ~0.17 Nm), however, the experimental values for $SRR_{\mathit{Eff}}$ are higher than predicted due to significant (but reversible) compression of the elastomeric struts.

EPT Driven Actuator Performance

Figure 9:
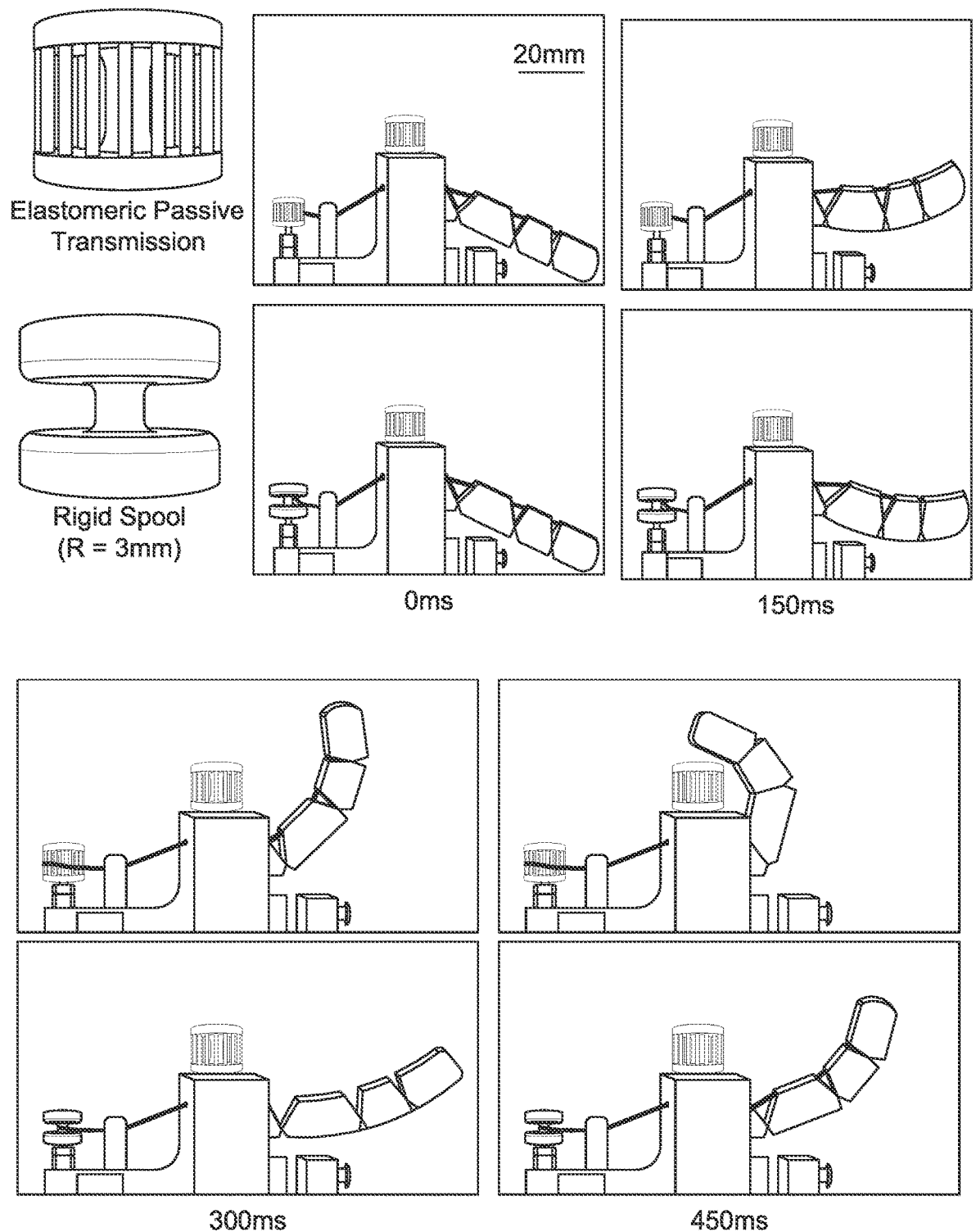
FIG. 9 illustrates a comparison of the unloaded finger closing time, with an elastomeric passive transmission used in the top panels and a 3 mm radius rigid spool (bottom)
Figure 10:
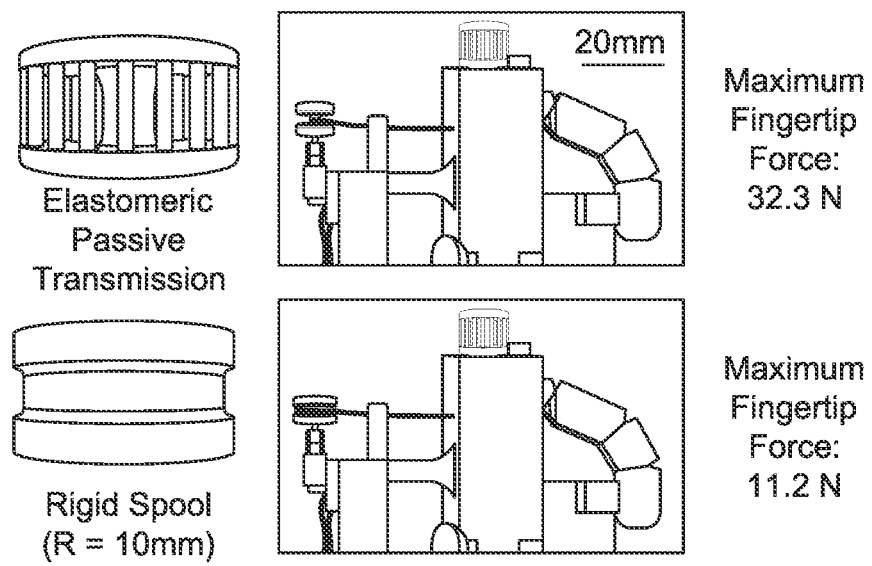
FIG. 10 illustrates a force comparison between a finger driven by a transmission of an embodiment of the present disclosure (top) and a 20 mm diameter rigid spool (bottom)
Figure 11:
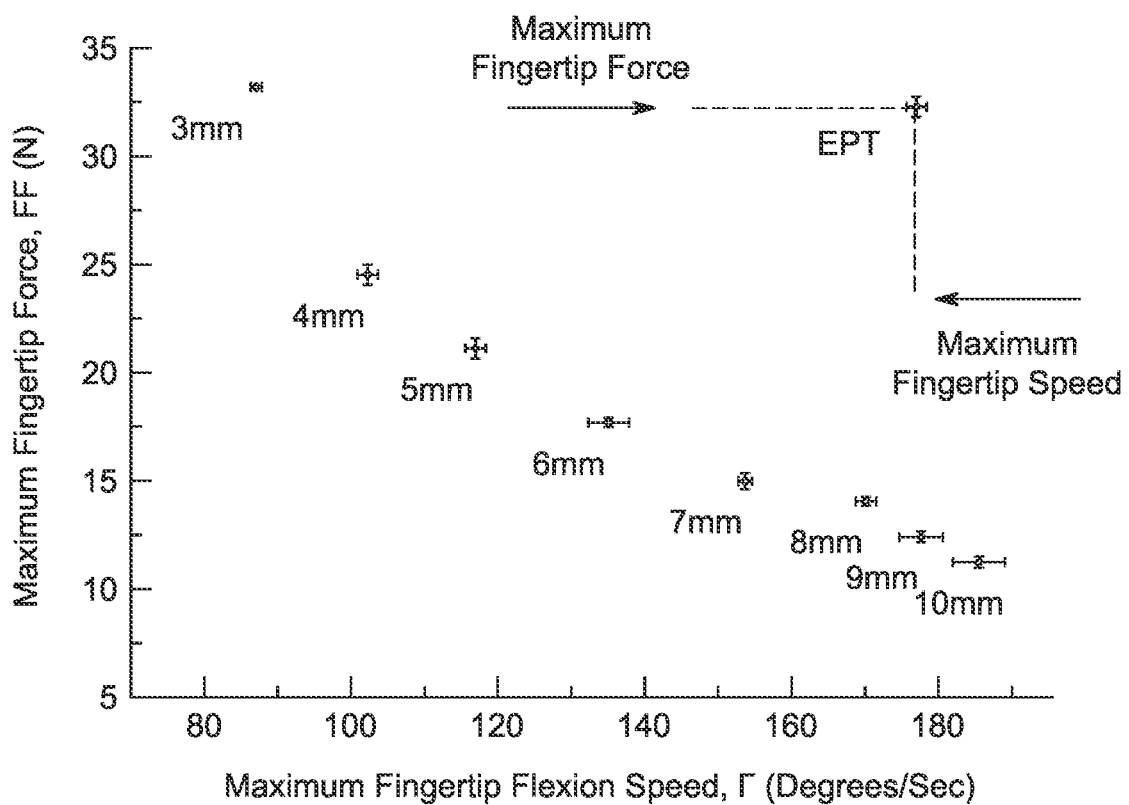
FIG. 11 is a graph depicting EPT performance outside the Pareto Front for speed and force generated by rigid spools of varying radius.

Two sets of experiments to characterize the performance of the EPT in a tendon-driven finger actuator were conducted. First, the maximum force that could be applied at the tip of the finger, FF (FIG. 9) was measured and, in the second experiment, the closing speed of the fingertip, Γ (FIG. 10), when its motion is unimpeded was measured. Γ is the average radial velocity about the synthetic metacarpophalangeal joint. In each of these experiments, an EPT with N=20, r=0.0625 mm, h=7 mm, referred to as EPT 2, was compared to an array of rigid spools with different radii (FIG. 11). The r=10 mm EPT closed the finger in 450 ms (Γ~180 degrees sec$^{-1}$) —the same maximum flexion speed as an r=9 mm rigid spool, and delivered a maximum fingertip force, FF ~32 N, equivalent to an r=3 mm rigid one. This shows that an EPT of the present disclosure achieves the speed benefits of a large radius spool while still delivering the high force of a small radius one.

EPT Fatigue Life

The benefits of elastomeric transmission systems are that they can be 3D printed quickly (50/hour), cheaply (<$1/ part), and in many compact form factors. Though they remain functional for actuation, the SRR of an EPT decreases with each broken strut. For the purpose of evaluating the fatigue life of the EPT as a whole, failure is defined as the breakage of at least 20% of its struts. A series of cyclic loading tests were conducted to quantify and extend the fatigue life of EPTs. It was found that the cycles to failure, $C_f$, for EPT 2 in high-speed mode (T~FA) was 2,497±1,115 cycles and that some failures occurred at the points of bending in the LPU not in contact with the tendon. These failures indicate that EPT wear is not caused by frictional abrasion of the constituent LPU but simply accumulated plastic deformation.

Figure 12A:
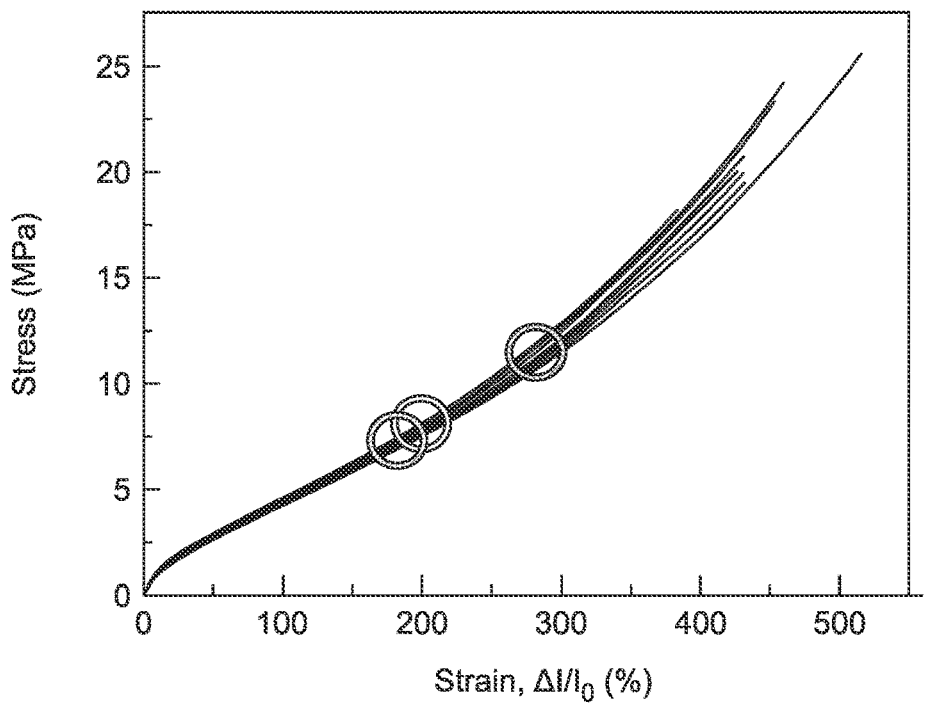
FIG. 12A is a graph showing tensile strain performance, to failure, for 7 samples of LPU.
Figure 12B:
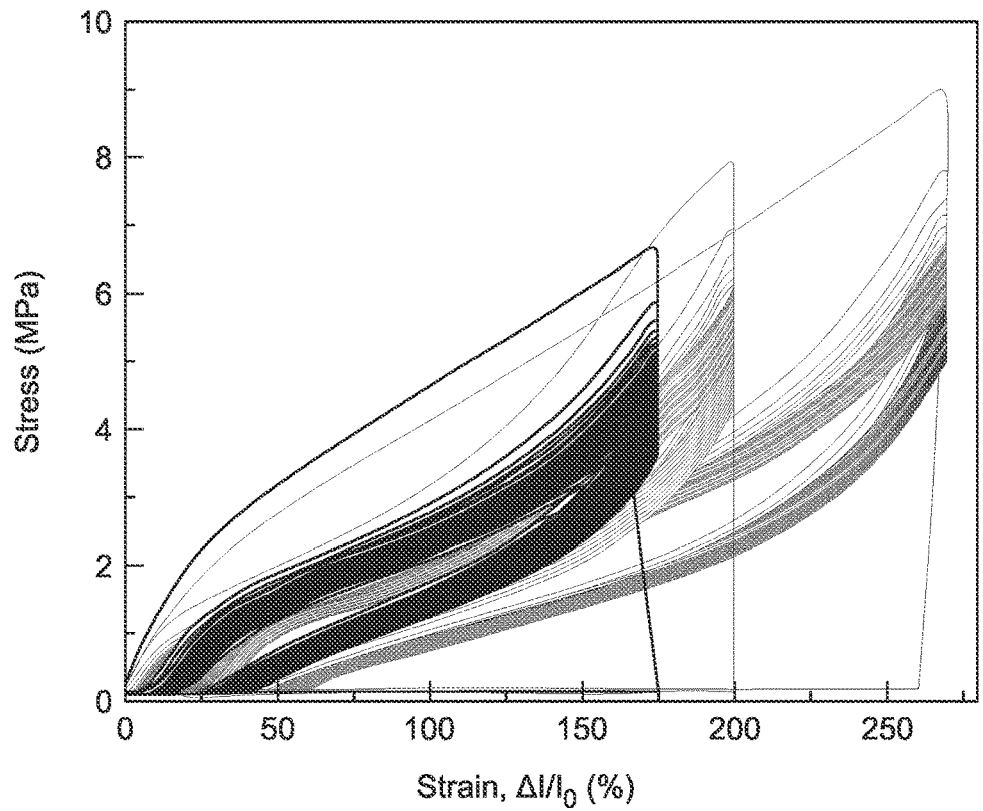
FIG. 12B is a graph showing cyclic tensile loading and unloading performance of LPU at strains corresponding to the circles in FIG. 12A.
Figure 13:
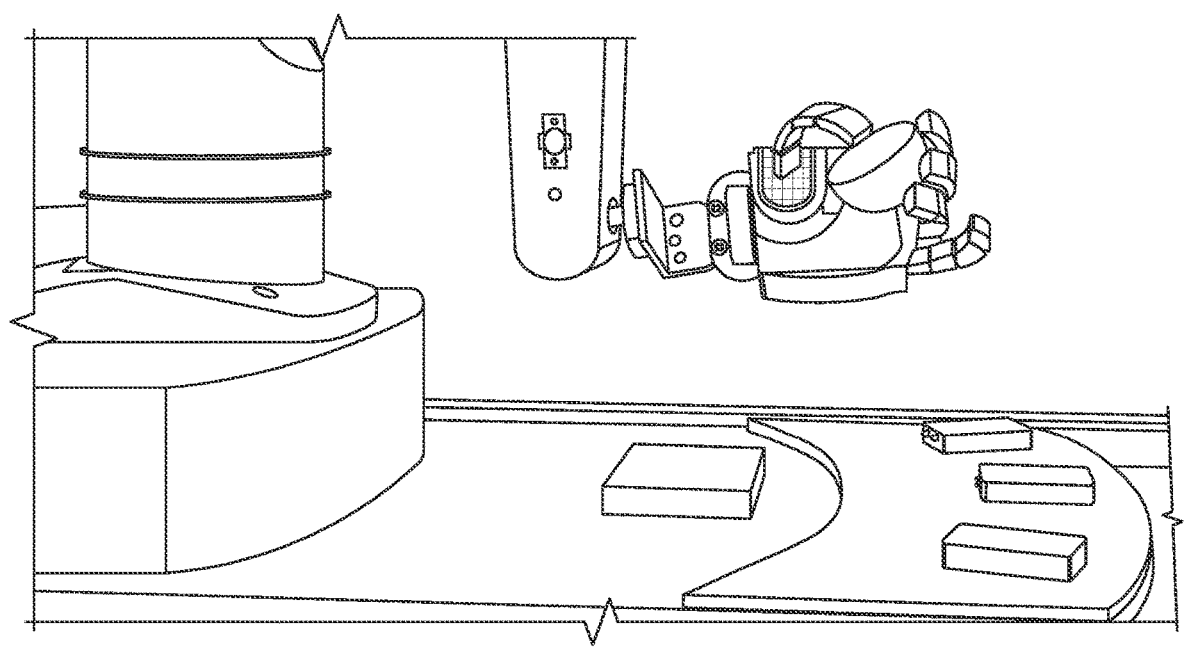
FIG. 13 is a time-lapse image of the ADEPT hand catching a thrown ball. Sensors detect the ball approaching at −7.5 cm and trigger closing of the hand.
Figure 14:
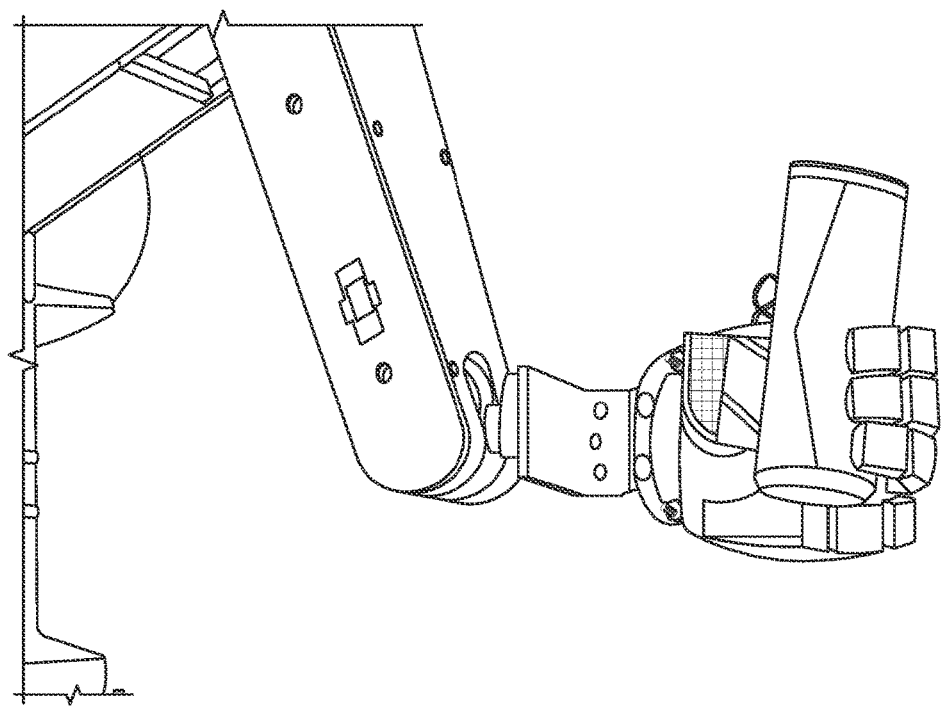
FIG. 14 is a demonstration of the ADEPT hand crushing an aluminum can.
Figure 15:
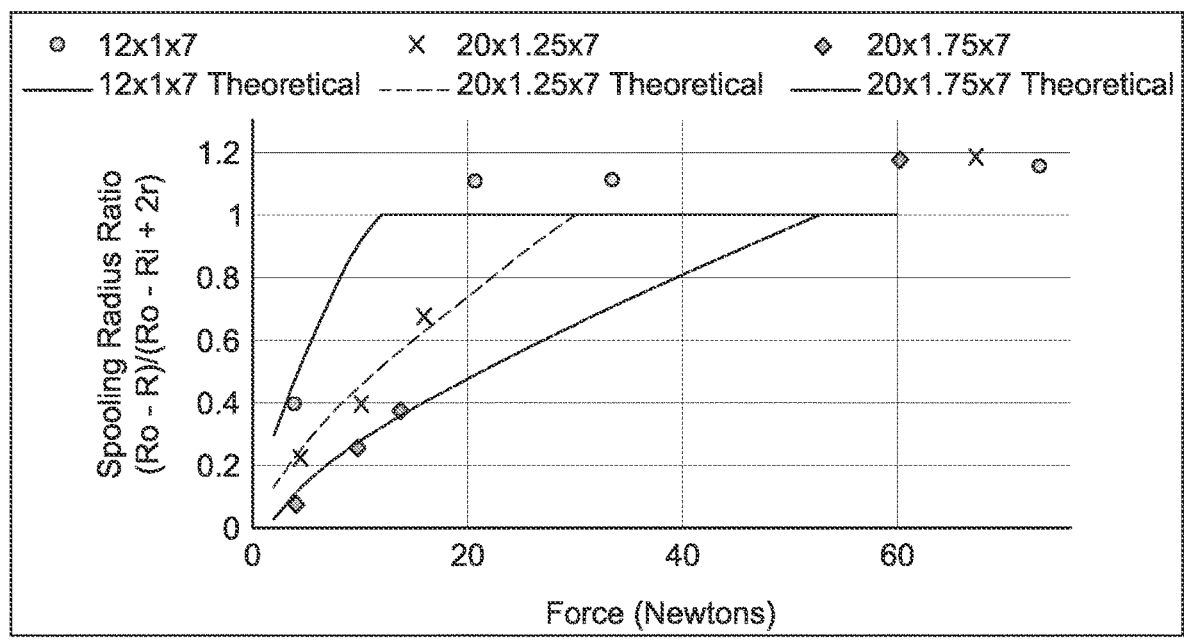
FIG. 15 is a graph showing the spooling radius ratio of three different transmission geometries as a function of tension in the cord.

When cycled to maximum force (high-force mode) EPT 2 demonstrated a reduced fatigue life of $C_f$=49±27 cycles. In high force mode, the maximum stress encountered by the EPT is $$\sigma_{max} \sim \frac{T}{wR} \sim 10 \text{ MPa},$$

corresponding to a strain of ε~270% (FIG. 12A). Cyclic testing of LPU samples in tension (FIG. 12B) at σ~270% resulted in $C_f$=32±15 cycles—verifying the wear mechanisms of the EPT in high force mode.

Using this information, the service life of the EPT was improved using two mechanical design changes intended to decrease local stresses and strains on the device. The first change, doubling the tendon diameter ($SRR_{\mathit{Eff}}$=2.63±0.07), increased the cycles to failure to $C_f$=2,743±146 cycles and $C_f$=200±32 cycles in high-speed mode and high-force mode, respectively. The second change, extending the 3D-printed LPU from the struts toward the core at the top and bottom of the EPT, in conjunction with the increased tendon diameter ($SRR_{\mathit{Eff}}$=2.18±0.07) led to a negligible increase in fatigue life in high-speed mode, $C_f$=3,140±907 cycles, and a significant increase in high-force mode, $C_f$=458±167 cycles. The high-force fatigue life of the EPTs incorporating these changes are consistent with the cyclic performance of LPU in tension at or below ε=175% ($C_f$=274±40 cycles). The ability to operate over 1000's of cycles in low force mode and 100's in high force mode should be sufficient for daily to weekly operation of a prosthetic hand. The low cost of the EPTs afford the ability to frequently replace the wearing EPTs.

Design of the ADEPT Hand

Figure 6B:
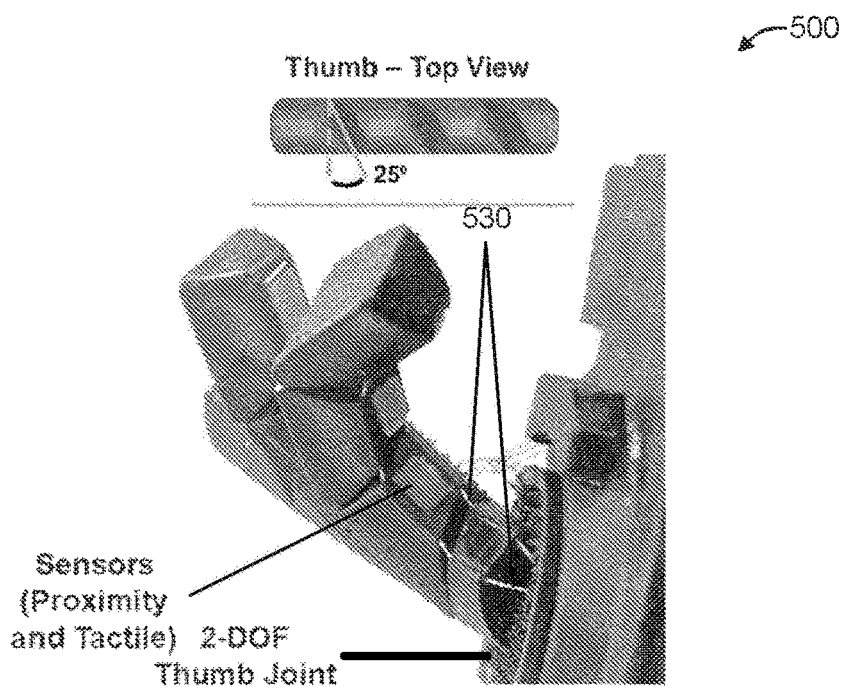
FIG. 6B is a time-lapse image of thumb flexion demonstrating its angled joints.

The ADEPT Hand was composed almost entirely from 3D-printed components (FIG. 6A). Each finger was printed from LPU with three living hinges, thickness ~0.5 mm, and three chambers for integrating sensors. The living hinges of the thumb were oriented at 25 degrees from the horizontal plane to promote twisting toward the palm upon actuation (FIG. 6B). The thumb also contained a mesh at its base which allowed emulation of the movement of a ball joint using a single elastomeric component. The palm of the hand was comprised of an inner plate and an outer casing (both printed with HPU). The inner plate secured the six motors and associated electronics; the outer casing had an LPU skin on the palm to increase its softness and friction for grasping.

The fingers were driven by inexpensive geared DC motors (~$15; 298:1 Micro Metal Gearmotor HP 6V, Pololu Corporation) with the exception of the thumb, which was driven by two motors—one for each of its two active degrees of freedom. The motors were powered by a 2-cell (7.4 Volts), 500 mAh Lithium Polymer battery which also resided in the palm of the hand. Although the motors are classified as 6-Volt motors, it is common practice to drive 6-Volt motors as high as 9 Volts for prosthetic applications. With the 2-cell battery, the hand had a mass of 399 g (365 g not including the battery)—less than the mass of the average human hand (~400 g).

Speed and Force Demonstrations

Figure 17:
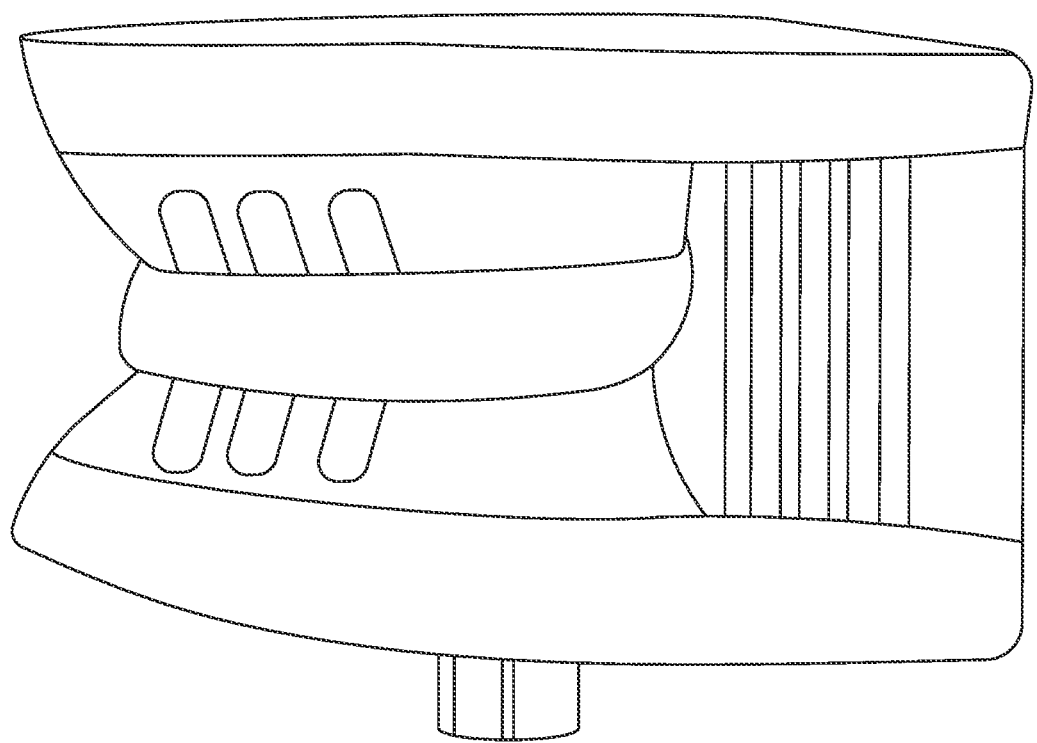
FIG. 17 shows an outer member which is partially constricted by the attached cord.
Figure 18:
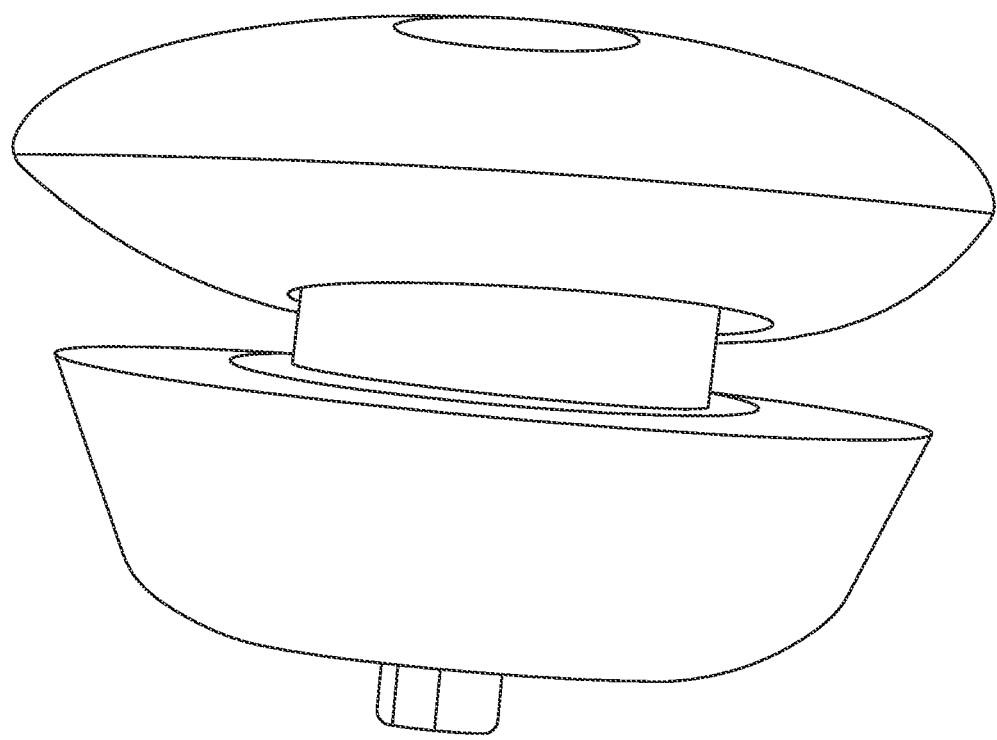
FIG. 18 shows an outer member which is fully constricted by the attached cord.

With the help of sensors and the speed afforded by the EPT, the ADEPT hand was capable of catching objects thrown to it (FIG. 17). In these demonstrations, the hand caught and held multiple objects including a 20 gram stress ball and a 12 oz soda can (empty weight ~13 grams). The sensors detected the approaching object at d~7.5 cm and triggered closing of the fingers and thumb around the object. Along with the flexion speed necessary to catch a thrown ball, the ADEPT hand had the strength to crush aluminum cans (FIG. 18) and hold heavy objects such as a wrench (900 grams). Without the EPT, the tendon-driven hand described herein would either have the speed to catch a ball or the strength to crush a can, but it would not be capable of both.

DISCUSSION

The Elastomeric Passive Transmission has allowed the creation of actuators with a ~3× increase in output force while maintaining maximum flexion speed, compared to a rigid spool. The simplicity of the EPT disclosed allows it to be small, lightweight, and inexpensive to manufacture—it also allows quick adjustment the size and effective spring constant of each device to work with a variety of different motors. By incorporating EPTs into the 3D-printed ADEPT prosthetic hand described herein, we have demonstrated one of many promising use cases for our passively adaptive transmission system. Using EPTs, these benefits can be realized in other areas such as active tendons, soft exosuits, bio-inspired mobile robots, jointed robotic systems, and any actuator with a cord.

The maximum spring constant of the EPTs disclosed, and thus their ability to provide a high $SRR_{\it{eff}}$ in systems with higher $\tau$ and $F_A$, is currently limited by the material properties of the elastomeric struts and the volume ($\pi R_o^2 h$) of the EPT. Though the spring constant of an EPT can be increased by decreasing the height of the struts (h), increasing the number of struts (N), or increasing the strut radius (r), each of these parameters have inherent limitations. Decreasing the height of the struts means that for the same maximum spooling radius ratio ($SRR_{max}$), the struts will be pushed closer to the material's strain at failure decreasing its serviceable lifetime. Increasing r leads to a decrease in $SRR_{max}$, and if $2rN>(R_i+2r)$, the struts will come in contact with each other before contacting the spool of the EPT, further reducing $SRR_{\it{eff}}$. By increasing both $R_o$ and h, r can be increased, and thus the spring constant of an EPT, without negatively impacting $SRR_{\it{eff}}$. Though this increase in the EPT's size would preclude its use in a prosthetic hand it would still be useful in a larger limb (or other robotic actuator) that requires the strength of a more powerful motor.

Based on cyclic experiments, it was determined that EPT failure is caused by crack propagation in the LPU struts due to cyclic loading. One approach to this issue is designing the mechanism to be swappable and taking advantage of the low cost and high speed of fabrication. Another approach is improving the mechanical design to reduce stress concentration and the material properties for improved resilience. Recent work in 3D-printed elastomers with higher fatigue resistance points to solutions to these problems. While metal additive manufacturing is another potential route for customized and compact passive transmission systems, several issues related to speed, resolution, cost, and the mechanical properties from directed energy deposition approaches remain to be solved.

The inexpensive EPTs were used to solve a persistent engineering contradiction in powered prosthetic hands—simultaneous high speed (180°/s) and high force (32 N) precision grasping, similar to the abilities of a human hand performing daily activities (200°/s; 96 N). Due to the compact form of the transmission system, and design freedom of stereolithography 3D printing, the batteries, motors, and tendons were co-designed to be contained within the form of the hand while weighing less than 400 grams. In comparison, the BeBionic prosthetic, as one example, locates the batteries outside of the hand and weighs ~500 grams.

Materials and Methods

Fabrication of EPTs

The CAD files for the EPTs were generated using Fusion 360 (Autodesk, Inc). The HPU cores and LPU struts were printed separately using projection stereolithography (M1, Carbon, Inc.). After cleaning the two parts, the HPU cores were inserted into the LPU struts and coated the seams with a thin layer (~0.5 mm) of liquid LPU resin. The LPU resin was cured for 15 seconds with UV light (365 nm; ECE 5000 Flood, DYMAX, Inc.) After UV curing, the EPTs were thermally cured at 120° C. for 8 hours to produce an HPU/LPU composite.

Fabrication of the ADEPT Hand

To fabricate the ADEPT hand, the components were designed using Fusion 360 and printed them with projection stereolithography. The motors were secured inside the palm with compression fitting straps (LPU). Each motor was driven by a DC motor driver breakout board (BD65496MUV, Pololu Corporation). The current draw of each motor was measured with high-side current sensor breakout boards (INA 219 High Side DC Current Sensor Breakout Board, Adafruit Industries, LLC). These motor drivers and current sensors were controlled by a microcontroller breakout board (Feather 32u4 Bluefruit LE, Adafruit Industries, Inc.). The microcontroller, motor-drivers, and current sensors were powered by a 1-cell (3.7 V) LiPo battery (LP402025, PKCELL Battery Co.), while the motors were powered by a separate 2-cell (7.4 V) LiPo (2S20C-500, DLG Electronics Technology Co.) After soldering and securing the electronics to a custom designed and printed plate in the palm (HPU), the EPTs were slid onto the motor shafts and the fingers and thumb into their respective recesses. In the next step, the Kevlar® threads (KEV138NATLO1B, Weaverville Thread, Inc.) were threaded through channels in the fingers and palm and tied them off at their EPT (one tendon thread per EPT). Finally, the front and back casing was screwed to the plate of the palm. The back casing was printed with HPU and the front casing was composed of HPU cured to an LPU lattice and membrane to promote friction and grasping.

Spooling Radius Vs Tension and Spooling Radius Ratio Experiments

To measure the relationship between tendon tension and spooling radius, each of the three EPT geometries were connected to four motors (Micro Metal Gearmotor HP 6V, Pololu Corporation) with different gear ratios (30:1, 75:1, 150:1, 298:1). For each measurement, a tendon was connected between the EPT (the tendon was wound once around the EPT without deforming the EPT struts) and a 5-kg load cell (Load Cell Sensor 0-5 kg, UXCELL). The loadcell output was amplified using an amplifier breakout board (Sparkfun Loadcell Amplifier—HX711, Sparkfun Electronics, Inc.) and read using a microcontroller (Arduino Uno, Arduino AG). The motors were run at 7.5 Volts and captured images (EOS REBEL T3i, Canon U.S.A., Inc.) of the deformed EPTs at stall (maximum torque). Each of the images were analyzed using imageJ to determine the effective spooling radius of the EPT. 7 trials were conducted for each of the EPT and motor combinations and averaged the data to generate the data points in FIG. 8B. The standard deviation for spooling radius did not exceed 0.1 mm for any of these data points. The standard deviation of the measured force did not exceed 0.5 N except for the highest force data points for EPT 1 (SD=1.68 N) and EPT 2 (SD=3.22 N).

The data from the spooling radius vs tension experiments was used as the effective inner radius ($R_{ie}$) in the effective spooling radius ratio ($SRR_{Eff}$) measurements (FIG. 8B). The effective outer radius ($R_{oe}$) was determined by driving a finger actuator with a 298:1 gear ratio motor and each of the three EPT geometries. Images were captured of the EPT deformation when the unloaded finger was fully actuated and used imageJ to determine the effective spooling radius. The reported values for $SRR_{Eff}$ were generated by dividing the averaged data for $R_{oe}$ over 7 trials by the averaged data for $R_{ie}$ over 7 trials.

Force Characterization of EPT-Driven Finger Actuators

To gather maximum fingertip force data for the finger actuators, 7.5 Volts was applied to the motor (298:1 Micro Metal Gearmotor HP 6V, Pololu Corporation) driving the actuator using a DC power supply (1745A, B&K Precision Corporation) until the motor stalled. While the motor was running, the fingertip force was measured with a 5-Kg loadcell (Load Cell Sensor 0-5 kg, UXCELL). The loadcell output was amplified using an amplifier breakout board (Sparkfun Loadcell Amplifier—HX711, Sparkfun Electronics, Inc.). The amplified signals were read using an Arduino Uno (Arduino AG). The highest force value for each experiment was recorded. The reported maximum fingertip force values are the average of 10 experiments.

Speed Characterization of EPT-Driven Finger Actuators

To measure the flexion speed of the EPT-driven fingers, they were mounted to a 3D-printed testing rig with an attached infrared proximity sensor (VCNL 4010, Vishay Intertechnology, Inc.). A command from the user to actuate the finger also started a timer within the microcontroller. A threshold value of the IR sensor was determined which was associated with full flexion of the finger. When this threshold value was exceeded, the microcontroller stopped the timer. Images (EOS REBEL T3i, Canon U.S.A., Inc.) of the finger were captured in the unactuated state and used imageJ to measure the angle between each of the joints in the finger. The reported flexion speed is the number of degrees traversed by the MCP joint (determined via imageJ) divided by the closing time reported by the microcontroller. The reported maximum finger flexion speeds are the average of 10 experiments.

Fatigue Testing of EPTs

The fatigue life of EPTs tested while driving a finger actuator. Each fatigue life data point represented included n=3 EPT specimens. The number of cycles were counted until the fourth LPU strut was broken. Tensile testing of LPU was conducted with a Zwick/Roell tensile testing machine. Fatigue life data of LPU includes n=3 data points with the exception of cyclic testing at σ=80% which includes only n=2 data points.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A variable transmission, comprising:
a spool comprising a rigid core defining a bore to receive a shaft; and
a constrictable outer member disposed about a circumference of the spool, the constrictable outer member comprising at least one elastically deformable element aligned with the rigid core and being configured to elastically deform between a first radius, corresponding to an unloaded state, and a second radius, corresponding to a fully loaded state, responsive to an applied force directed toward the rigid core and
a cord configured to at least partially wrap around the constrictable outer member and to apply thereto, when tensioned, a force directed to the rigid core,
wherein a magnitude of elastic deformation of the at least one elastically deformable element toward the rigid core is related to a magnitude of an applied force, with a greater applied force causing a greater elastic deformation of the at least one elastically deformable element toward the rigid core.

2. The variable transmission according to claim 1, wherein a rigidity of the spool is greater than a rigidity of the at least one elastically deformable element.

3. The variable transmission according to claim 1, wherein the spool and the constrictable outer member are formed from the same material or materials, or optionally from a different material or materials.

4. The variable transmission according to claim 3, wherein the spool and the constrictable outer member are formed as a unitary part from the same material.

5. The variable transmission according to claim 1, wherein the spool comprises metal or alloy; a polymer or polymer composite, an organic material, or a combination of two or more materials,
wherein the metal or alloy is one of steel, aluminum, or titanium,
wherein the polymer or polymer composite is one of nylon, polycarbonate, polyester, polyethylene, polypropylene, polystyrene, polyvinyl chloride, acrylonitrile butadiene styrene, polyurethane, epoxy, acrylic, phenolics, melamine formaldehyde, urea-formaldehyde, PEEK, maleimide, PEI, polyimide, plastarch, polylactic acide, polysulfone, or carbon fiber, and wherein the organic material is one of wood or bioplastic.

6. The variable transmission according to claim 1, wherein the spool has a first side wall and a second side wall with the rigid core extending between the first side wall and the second side wall to collectively define a region having a fixed volume, wherein the at least one elastically deformable element of the constrictable outer member is disposed to extend from the first side wall to the second side wall, and wherein a first portion of the constrictable outer member is connected to the first side wall and a second portion of the constrictable outer member is connected to the second side wall.

7. The variable transmission according to claim 6, wherein the at least one elastically deformable element of the constrictable outer member comprises a plurality of elastomeric struts extending between the first side wall and the second side wall and configured to elastically deform between the first radius and the second radius corresponding to an applied external force directed toward the rigid core.

8. The variable transmission according to claim 6, wherein the at least one elastically deformable element of the constrictable outer member comprises an elastomeric lattice extending between the first side wall and the second side wall.

9. The variable transmission according to claim 6, wherein the at least one elastically deformable element of the constrictable outer member comprises an elastomeric film or a fabric extending between the first side wall and the second side wall, the elastomeric film or the fabric optionally including one or more through holes.

10. The variable transmission according to claim 6, wherein the rigid core is configured to maintain a fixed spacing between the first side wall and the second side wall.

11. The variable transmission according to claim 1, wherein the at least one elastically deformable element of the constrictable outer member comprises a plurality of vanes arranged radially about the rigid core, each of the plurality of vanes extending outwardly from the second radius at a proximal end to the first radius at a distal end, and wherein each of the plurality of vanes is configured to elastically bend responsive to an applied external force at a distal end of the vane.

12. The variable transmission according to claim 11, wherein each vane of the plurality of vanes is curved when in a state corresponding to an unloaded state.

13. The variable transmission according to claim 11, wherein each vane of the plurality of vanes are each made of an elastic material selected from at least one of spring steel or nylon.

14. A prosthetic comprising the variable transmission of claim 1, the prosthetic further comprising:

a prosthetic body including a first portion and a second portion, the second portion movably connected to the first portion via a joint; and a drive shaft disposed within the bore of the rigid core, wherein the variable transmission is disposed on or adjacent the first portion, wherein the cord comprises a first end attached to the second portion and a second end attached to a cord coupler formed in or connected to the spool or the constrictable outer member, and wherein rotation of the drive shaft is configured to cause movement of the second portion by way of the cord.

15. The variable transmission according to claim 1, further comprising at least one component for measuring a level of deflection of the constrictable outer member.

16. The variable transmission according to claim 1, wherein the constrictable outer member is a foam.

17. The variable transmission according to claim 1, wherein the constrictable outer member comprises a foam, polyurethane, a 3D-printed lattice, silicone, an elastomeric material, nitrile, latex, or butyl rubber.

18. A robot comprising the variable transmission of claim 1, the robot further comprising:

a first member;

a second member movably connected to the first member via a joint; and a drive shaft disposed within the bore of the rigid core, wherein the variable transmission is disposed on or adjacent the first member, wherein the cord comprises a first end attached directly or indirectly to the second member and a second end attached to a cord coupled formed in or connected to the spool or the constrictable outer member, and wherein rotation of the drive shaft is configured to cause movement of the second member relative to the first member by way of the cord.

19. A transmission, comprising:

a spool having a bore;

a constrictable outer member disposed around a circumference of the spool; and a cord configured to at least partially wrap around the outer member such that rotation of the spool causes a tension force to be applied to the cord, wherein a greater tension force causes the outer member to constrict more than a lower tension force;

wherein the constrictable outer member is a lattice and wherein the lattice is a foam.

* * * * *